US012770142B2

(12) United States Patent
Kan et al.

(10) Patent No.: US 12,770,142 B2
(45) Date of Patent: Oct. 20, 2026

(54) SYSTEM, METHOD, AND COMPUTER PROGRAM PRODUCT FOR INTERPRETING BLACK BOX MODELS FOR PAYMENT AUTHORIZATION DECISIONS

(71) Applicant: Visa International Service Association, San Francisco, CA (US)

(72) Inventors: Xi Kan, Austin, TX (US); Dan Wang, Cedar Park, TX (US); Okeoghene Duke Onovae, Foster City, CA (US); Rajat Das, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 43 days.

(21) Appl. No.: 18/835,380

(22) PCT Filed: Feb. 3, 2023

(86) PCT No.: PCT/US2023/012248
§ 371 (c)(1),
(2) Date: Aug. 2, 2024

(87) PCT Pub. No.: WO2023/150247
PCT Pub. Date: Aug. 10, 2023

(65) Prior Publication Data
US 2025/0139620 A1 May 1, 2025

Related U.S. Application Data

(60) Provisional application No. 63/306,550, filed on Feb. 4, 2022.

(51) Int. Cl.
*G06Q 20/40* (2012.01)

(52) U.S. Cl.
CPC .................................. *G06Q 20/40* (2013.01)

(58) Field of Classification Search
CPC ..................................................... G06Q 20/40
See application file for complete search history.

(56) References Cited

U.S. PATENT DOCUMENTS 8,635,117 B1 * 1/2014 Acuna-Rohter ....... G06Q 20/40 705/26.35
9,685,024 B2 * 6/2017 Kemper ................ G06Q 20/40
(Continued)

OTHER PUBLICATIONS

Agarwal et al., "AI-powered decision making for the bank of the future", McKinsey & Company, 2021, pp. 1-12.
(Continued)

*Primary Examiner* — William E Rankins
(74) *Attorney, Agent, or Firm* — The Webb Law Firm

(57) ABSTRACT

A computer-implemented method includes: receiving an inquiry request message identifying a first payment transaction having a first plurality of transaction parameters and a first authorization decision; querying a database including transaction data associated with a plurality of historical payment transactions to identify a subset of historical payment transactions, the transaction data including, for each of the plurality of historical payment transactions, a plurality of transaction parameters and an authorization decision, the subset of historical payment transactions including payment transactions having an authorization decision different from the first authorization decision and having a similarity score that satisfies a threshold; determining an impact parameter of the first plurality of transaction parameters by comparing the first plurality of transaction parameters with the plurality of transaction parameters associated with the plurality of historical payment transactions in the subset; and generating an inquiry response message based on the impact parameter.

18 Claims, 15 Drawing Sheets

(56) References Cited

U.S. PATENT DOCUMENTS

| | | | |
|---|---|---|---|
| 10,462,172 | B1 | 10/2019 | Sadaghiani et al. |
| 10,599,984 | B1 | 3/2020 | Wubbels et al. |
| 11,233,761 | B1 * | 1/2022 | Gusev .................... G06N 20/00 |
| 12,165,017 | B1 | 12/2024 | Grossman |
| 2013/0218758 | A1 | 8/2013 | Koenigsbrueck et al. |
| 2014/0379561 | A1 | 12/2014 | Amancherla et al. |
| 2016/0224980 | A1 | 8/2016 | Stinchcombe |
| 2017/0124570 | A1 | 5/2017 | Nidamanuri et al. |
| 2017/0330109 | A1 | 11/2017 | Maughan et al. |
| 2017/0372318 | A1 * | 12/2017 | Shami ................... G06F 16/332 |
| 2018/0060738 | A1 | 3/2018 | Achin et al. |
| 2020/0111037 | A1 | 4/2020 | Mondal |
| 2020/0380021 | A1 * | 12/2020 | Barbour ................ G06F 16/164 |
| 2020/0380455 | A1 | 12/2020 | Joy et al. |
| 2020/0394659 | A1 | 12/2020 | Qu et al. |
| 2021/0133632 | A1 | 5/2021 | Elprin et al. |
| 2021/0264432 | A1 * | 8/2021 | Devdas .............. G06Q 20/4016 |
| 2021/0279633 | A1 | 9/2021 | Derany et al. |
| 2022/0414336 | A1 * | 12/2022 | Abraham ............... G06N 20/00 |
| 2024/0095547 | A1 | 3/2024 | Gupta et al. |
| 2024/0112066 | A1 | 4/2024 | Ba et al. |
| 2024/0303148 | A1 | 9/2024 | Gosala et al. |

OTHER PUBLICATIONS

Guidotti et al., "A Survey of Methods for Explaining Black Box Models", ACM Computing Surveys, 2018, pp. 1-42, vol. 51, No. 5.

Lucas, "Credit card fraud detection using machine learning with integration of contextual knowledge", Diss. Université de Lyon; Universität Passau (Allemagne), 2019, pp. 1-125.

* cited by examiner

800

150

154

| Impact Parameter | Inquiry Response Message |
|---|---|
| P1 | "The transaction was declined based on an excessively high transaction amount." |
| P2 | "The transaction was declined based on the geographical location at which the transaction was initiated." |
| P3 | "The transaction was declined because the merchant category code does not fit historical user spending patterns." |
| P4 | "The transaction was declined based on excessively high transaction velocity in last 24 hours." |
| P1+P3 | "The transaction was declined based on an excessively high transaction amount for the instant merchant category code." |
| ... | |

FIG. 8

SYSTEM, METHOD, AND COMPUTER PROGRAM PRODUCT FOR INTERPRETING BLACK BOX MODELS FOR PAYMENT AUTHORIZATION DECISIONS

CROSS REFERENCE TO RELATED APPLICATIONS

This application is the United States national phase of International Patent Application No. PCT/US2023/012248, filed on Feb. 3, 2023, and claims priority to U.S. Provisional Patent Application No. 63/306,550, filed on Feb. 4, 2022, the disclosures of which are incorporated by reference herein in their entireties.

BACKGROUND

1. Technical Field

This disclosure relates generally to "black box" machine learning models and, in non-limiting embodiments or aspects, to systems, methods, and computer program products for interpreting black box machine learning models for payment authorization decisions for electronic payment transactions.

2. Technical Considerations

"Black box" machine learning models are being introduced for generating automated payment authorization decisions (e.g., authorize or decline) for electronic payment transactions. However, due to the unknown (e.g., "black box") nature of the machine learning models, it is difficult to understand which aspects of the input data drive the authorization decision (e.g., the output) of the model. This lack of transparency makes it difficult for users to monitor the model, understand or learn from the model, or justify its outcomes when challenged. Further, the lack of transparency hinders the user's ability to remedy errors in the model, such as by updating or retraining the model, and to enhance the efficiency of the model by reducing the computational resources needed to perform its processes.

SUMMARY

Accordingly, provided are improved, systems, methods, and computer program products for interpreting black box models for payment authorization decisions.

According to non-limiting embodiments or aspects, provided is a computer-implemented method including: receiving, with at least one processor, an inquiry request message identifying a first payment transaction having a first plurality of transaction parameters and a first authorization decision; querying, with at least one processor, a database including transaction data associated with a plurality of historical payment transactions to identify a subset of historical payment transactions, the transaction data including, for each of the plurality of historical payment transactions, a plurality of transaction parameters and an authorization decision, where the subset of historical payment transactions includes payment transactions having an authorization decision different from the first authorization decision and having a similarity score that satisfies a threshold; determining, with at least one processor, at least one impact parameter of the first plurality of transaction parameters by comparing the first plurality of transaction parameters with the plurality of transaction parameters associated with the plurality of historical payment transactions in the subset; and generating, with at least one processor, an inquiry response message based on the at least one impact parameter.

In non-limiting embodiments or aspects, querying the database to identify the subset of historical payment transactions may include: filtering, with at least one processor, a second subset of historical payment transactions from the plurality of historical payment transactions based on each historical payment transaction in the second subset including an authorization decision different from the first authorization decision; for each of the historical payment transactions in the second subset, generating, with at least one processor, a similarity score relative to the first payment transaction based on comparing the first plurality of transaction parameters to the plurality of transaction parameters associated with each of the historical payment transactions in the second subset; and identifying, with at least one processor, the subset of historical payment transactions as a subset of the second subset based on the similarity score for each payment transaction in the subset of historical payment transactions satisfying the threshold. Generating the similarity score may include: generating a first score based on comparing categorical transaction parameters of the first plurality of transaction parameters to categorical transaction parameters of the plurality of transaction parameters associated with each of the historical payment transactions in the second subset; generating a second score based on comparing numerical transaction parameters of the first plurality of transaction parameters to numerical transaction parameters of the plurality of transaction parameters associated with each of the historical payment transactions in the second subset; and generating the similarity score as a composite of the first score and the second score.

In non-limiting embodiments or aspects, the second subset may not include all of the historical payment transactions in the plurality of historical payment transactions, and the subset may not include all of the historical payment transactions in the second subset. The first authorization decision may have been generated by a transaction processing system of a transaction service provider acting on behalf of an issuer system of an issuer. The first authorization decision may have been generated by the transaction processing system while the issuer system failed to communicate with an electronic payment processing network. The first authorization decision may have been generated by the transaction processing system by applying the first plurality of transaction parameters to a black box machine-learning model, where the black box machine-learning model is generated based on modeling historical authorization decisions of the issuer system. The first authorization decision may have been generated by the transaction processing system based on historical transaction data associated with a user initiating the first payment transaction. The first authorization decision may include an authorization decline, and the authorization decision for each historical payment transaction in the subset may include an authorization approval. The impact parameter may have at least partially caused generation of the first authorization decision different from the authorization decisions of the plurality of historical payment transactions in the subset. The method may include: displaying, on a user device, data associated with the first payment transaction and a selectable element associated with the data associated with the first payment transaction; receiving, by the user device, user input indicating selection of the selectable element; and in response to selection of the selectable element, generating and transmitting, by the user device, the inquiry request message.

According to non-limiting embodiments or aspects, provided is a system including at least one processor programmed or configured to: receive an inquiry request message identifying a first payment transaction having a first plurality of transaction parameters and a first authorization decision; query a database including transaction data associated with a plurality of historical payment transactions to identify a subset of historical payment transactions, the transaction data including, for each of the plurality of historical payment transactions, a plurality of transaction parameters and an authorization decision, where the subset of historical payment transactions includes payment transactions having an authorization decision different from the first authorization decision and having a similarity score that satisfies a threshold; determine at least one impact parameter of the first plurality of transaction parameters by comparing the first plurality of transaction parameters with the plurality of transaction parameters associated with the plurality of historical payment transactions in the subset; and generate an inquiry response message based on the at least one impact parameter.

In non-limiting embodiments or aspects, querying the database to identify the subset of historical payment transactions may include the at least one processor being programmed or configured to: filter a second subset of historical payment transactions from the plurality of historical payment transactions based on each historical payment transaction in the second subset including an authorization decision different from the first authorization decision; for each of the historical payment transactions in the second subset, generate a similarity score relative to the first payment transaction based on comparing the first plurality of transaction parameters to the plurality of transaction parameters associated with each of the historical payment transactions in the second subset; and identify the subset of historical payment transactions as a subset of the second subset based on the similarity score for each payment transaction in the subset of historical payment transactions satisfying the threshold. Generating the similarity score may include the at least one processor being programmed or configured to: generate a first score based on comparing categorical transaction parameters of the first plurality of transaction parameters to categorical transaction parameters of the plurality of transaction parameters associated with each of the historical payment transactions in the second subset; generate a second score based on comparing numerical transaction parameters of the first plurality of transaction parameters to numerical transaction parameters of the plurality of transaction parameters associated with each of the historical payment transactions in the second subset; and generate the similarity score as a composite of the first score and the second score.

In non-limiting embodiments or aspects, the second subset may not include all of the historical payment transactions in the plurality of historical payment transactions, and the subset may not include all of the historical payment transactions in the second subset. The first authorization decision may have been generated by a transaction processing system of a transaction service provider acting on behalf of an issuer system of an issuer. The first authorization decision may have been generated by the transaction processing system while the issuer system failed to communicate with an electronic payment processing network. The first authorization decision may have been generated by the transaction processing system by applying the first plurality of transaction parameters to a black box machine-learning model, where the black box machine-learning model is generated based on modeling historical authorization decisions of the issuer system. The first authorization decision may have been generated by the transaction processing system based on historical transaction data associated with a user initiating the first payment transaction. The first authorization decision may include an authorization decline, and the authorization decision for each historical payment transaction in the subset may include an authorization approval. The impact parameter may have at least partially caused generation of the first authorization decision different from the authorization decisions of the plurality of historical payment transactions in the subset. The system may further include a user device programmed or configured to: display data associated with the first payment transaction and a selectable element associated with the data associated with the first payment transaction; receive user input indicating selection of the selectable element; and in response to selection of the selectable element, generate and transmit the inquiry request message.

According to non-limiting embodiments or aspects, provided is a computer program product including at least one non-transitory computer-readable medium including program instructions that, when executed by at least one processor, cause the at least one processor to: receive an inquiry request message identifying a first payment transaction having a first plurality of transaction parameters and a first authorization decision; query a database including transaction data associated with a plurality of historical payment transactions to identify a subset of historical payment transactions, the transaction data including, for each of the plurality of historical payment transactions, a plurality of transaction parameters and an authorization decision, where the subset of historical payment transactions includes payment transactions having an authorization decision different from the first authorization decision and having a similarity score that satisfies a threshold; determine at least one impact parameter of the first plurality of transaction parameters by comparing the first plurality of transaction parameters with the plurality of transaction parameters associated with the plurality of historical payment transactions in the subset; and generate an inquiry response message based on the at least one impact parameter.

In non-limiting embodiments or aspects, querying the database to identify the subset of historical payment transactions may include the program instructions causing the at least one processor to: filter a second subset of historical payment transactions from the plurality of historical payment transactions based on each historical payment transaction in the second subset including an authorization decision different from the first authorization decision; for each of the historical payment transactions in the second subset, generate a similarity score relative to the first payment transaction based on comparing the first plurality of transaction parameters to the plurality of transaction parameters associated with each of the historical payment transactions in the second subset; and identify the subset of historical payment transactions as a subset of the second subset based on the similarity score for each payment transaction in the subset of historical payment transactions satisfying the threshold. Generating the similarity score may include the program instructions causing the at least one processor to: generate a first score based on comparing categorical transaction parameters of the first plurality of transaction parameters to categorical transaction parameters of the plurality of transaction parameters associated with each of the historical payment transactions in the second subset; generate a second score based on comparing numerical transaction parameters of the first plurality of transaction parameters to numerical transaction parameters of the plurality of transaction parameters associated with each of the historical payment transactions in the second subset; and generate the similarity score as a composite of the first score and the second score.

In non-limiting embodiments or aspects, the second subset may not include all of the historical payment transactions in the plurality of historical payment transactions, and the subset may not include all of the historical payment transactions in the second subset. The first authorization decision may have been generated by a transaction processing system of a transaction service provider acting on behalf of an issuer system of an issuer. The first authorization decision may have been generated by the transaction processing system while the issuer system failed to communicate with an electronic payment processing network. The first authorization decision may have been generated by the transaction processing system by applying the first plurality of transaction parameters to a black box machine-learning model, where the black box machine-learning model is generated based on modeling historical authorization decisions of the issuer system. The first authorization decision may have been generated by the transaction processing system based on historical transaction data associated with a user initiating the first payment transaction. The first authorization decision may include an authorization decline, and the authorization decision for each historical payment transaction in the subset may include an authorization approval. The impact parameter may have at least partially caused generation of the first authorization decision different from the authorization decisions of the plurality of historical payment transactions in the subset. The program instructions, when executed by a user device, may cause the user device to: display data associated with the first payment transaction and a selectable element associated with the data associated with the first payment transaction; receive user input indicating selection of the selectable element; and in response to selection of the selectable element, generate and transmit the inquiry request message.

Further non-limiting embodiments or aspects are set forth in the following numbered clauses:

Clause 1: A computer-implemented method comprising: receiving, with at least one processor, an inquiry request message identifying a first payment transaction having a first plurality of transaction parameters and a first authorization decision; querying, with at least one processor, a database comprising transaction data associated with a plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with at least one processor, at least one impact parameter of the first plurality of transaction parameters by comparing the first plurality of transaction parameters with the plurality of transaction parameters associated with the plurality of historical payment transactions in the subset; and generating, with at least one processor, an inquiry response message based on the at least one impact parameter.

Clause 2: The method of clause 1, wherein querying the database to identify the subset of historical payment transactions comprises: filtering, with at least one processor, a second subset of historical payment transactions from the plurality of historical payment transactions based on each historical payment transaction in the second subset comprising an authorization decision different from the first authorization decision; for each of the historical payment transactions in the second subset, generating, with at least one processor, a similarity score relative to the first payment transaction based on comparing the first plurality of transaction parameters to the plurality of transaction parameters associated with each of the historical payment transactions in the second subset; and identifying, with at least one processor, the subset of historical payment transactions as a subset of the second subset based on the similarity score for each payment transaction in the subset of historical payment transactions satisfying the threshold.

Clause 3: The method of clause 1 or 2, wherein generating the similarity score comprises: generating a first score based on comparing categorical transaction parameters of the first plurality of transaction parameters to categorical transaction parameters of the plurality of transaction parameters associated with each of the historical payment transactions in the second subset; generating a second score based on comparing numerical transaction parameters of the first plurality of transaction parameters to numerical transaction parameters of the plurality of transaction parameters associated with each of the historical payment transactions in the second subset; and generating the similarity score as a composite of the first score and the second score.

Clause 4: The method of any of clauses 1-3, wherein the second subset does not include all of the historical payment transactions in the plurality of historical payment transactions, and the subset does not include all of the historical payment transactions in the second subset.

Clause 5: The method of any of clauses 1-4, wherein the first authorization decision was generated by a transaction processing system of a transaction service provider acting on behalf of an issuer system of an issuer.

Clause 6: The method of any of clauses 1-5, wherein the first authorization decision was generated by the transaction processing system while the issuer system failed to communicate with an electronic payment processing network.

Clause 7: The method of any of clauses 1-6, wherein the first authorization decision was generated by the transaction processing system by applying the first plurality of transaction parameters to a black box machine-learning model, wherein the black box machine-learning model is generated based on modeling historical authorization decisions of the issuer system.

Clause 8: The method of any of clauses 1-7, wherein the first authorization decision was generated by the transaction processing system based on historical transaction data associated with a user initiating the first payment transaction.

Clause 9: The method of any of clauses 1-8, wherein the first authorization decision comprises an authorization decline, and the authorization decision for each historical payment transaction in the subset comprises an authorization approval.

Clause 10: The method of any of clauses 1-9, wherein the impact parameter at least partially caused generation of the first authorization decision different from the authorization decisions of the plurality of historical payment transactions in the subset.

Clause 11: The method of any of clauses 1-10, comprising: displaying, on a user device, data associated with the first payment transaction and a selectable element associated with the data associated with the first payment transaction; receiving, by the user device, user input indicating selection of the selectable element; and in response to selection of the selectable element, generating and transmitting, by the user device, the inquiry request message.

Clause 12: A system comprising at least one processor programmed or configured to: receive an inquiry request message identifying a first payment transaction having a first plurality of transaction parameters and a first authorization decision; query a database comprising transaction data associated with a plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determine at least one impact parameter of the first plurality of transaction parameters by comparing the first plurality of transaction parameters with the plurality of transaction parameters associated with the plurality of historical payment transactions in the subset; and generate an inquiry response message based on the at least one impact parameter.

Clause 13: The system of clause 12, wherein querying the database to identify the subset of historical payment transactions comprises the at least one processor being programmed or configured to: filter a second subset of historical payment transactions from the plurality of historical payment transactions based on each historical payment transaction in the second subset comprising an authorization decision different from the first authorization decision; for each of the historical payment transactions in the second subset, generate a similarity score relative to the first payment transaction based on comparing the first plurality of transaction parameters to the plurality of transaction parameters associated with each of the historical payment transactions in the second subset; and identify the subset of historical payment transactions as a subset of the second subset based on the similarity score for each payment transaction in the subset of historical payment transactions satisfying the threshold.

Clause 14: The system of clause 12 or 13, wherein generating the similarity score comprises the at least one processor being programmed or configured to: generate a first score based on comparing categorical transaction parameters of the first plurality of transaction parameters to categorical transaction parameters of the plurality of transaction parameters associated with each of the historical payment transactions in the second subset; generate a second score based on comparing numerical transaction parameters of the first plurality of transaction parameters to numerical transaction parameters of the plurality of transaction parameters associated with each of the historical payment transactions in the second subset; and generate the similarity score as a composite of the first score and the second score.

Clause 15: The system of any of clauses 12-14, wherein the second subset does not include all of the historical payment transactions in the plurality of historical payment transactions, and the subset does not include all of the historical payment transactions in the second subset.

Clause 16: The system of any of clauses 12-15, wherein the first authorization decision was generated by a transaction processing system of a transaction service provider acting on behalf of an issuer system of an issuer.

Clause 17: The system of any of clauses 12-16, wherein the first authorization decision was generated by the transaction processing system while the issuer system failed to communicate with an electronic payment processing network.

Clause 18: The system of any of clauses 12-17, wherein the first authorization decision was generated by the transaction processing system by applying the first plurality of transaction parameters to a black box machine-learning model, wherein the black box machine-learning model is generated based on modeling historical authorization decisions of the issuer system.

Clause 19: The system of any of clauses 12-18, wherein the first authorization decision was generated by the transaction processing system based on historical transaction data associated with a user initiating the first payment transaction.

Clause 20: The system of any of clauses 12-19, wherein the first authorization decision comprises an authorization decline, and the authorization decision for each historical payment transaction in the subset comprises an authorization approval.

Clause 21: The system of any of clauses 12-20, wherein the impact parameter at least partially caused generation of the first authorization decision different from the authorization decisions of the plurality of historical payment transactions in the subset.

Clause 22: The system of any of clauses 12-21, further comprising a user device programmed or configured to: display data associated with the first payment transaction and a selectable element associated with the data associated with the first payment transaction; receive user input indicating selection of the selectable element; and in response to selection of the selectable element, generate and transmit the inquiry request message.

Clause 23: A computer program product comprising at least one non-transitory computer-readable medium including program instructions that, when executed by at least one processor, cause the at least one processor to: receive an inquiry request message identifying a first payment transaction having a first plurality of transaction parameters and a first authorization decision; query a database comprising transaction data associated with a plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determine at least one impact parameter of the first plurality of transaction parameters by comparing the first plurality of transaction parameters with the plurality of transaction parameters associated with the plurality of historical payment transactions in the subset; and generate an inquiry response message based on the at least one impact parameter.

Clause 24: The computer program product of clause 23, wherein querying the database to identify the subset of historical payment transactions comprises the program instructions causing the at least one processor to: filter a second subset of historical payment transactions from the plurality of historical payment transactions based on each historical payment transaction in the second subset comprising an authorization decision different from the first authorization decision; for each of the historical payment transactions in the second subset, generate a similarity score relative to the first payment transaction based on comparing the first plurality of transaction parameters to the plurality of transaction parameters associated with each of the historical payment transactions in the second subset; and identify the subset of historical payment transactions as a subset of the second subset based on the similarity score for each payment transaction in the subset of historical payment transactions satisfying the threshold.

Clause 25: The computer program product of clause 23 or 24, wherein generating the similarity score comprises the program instructions causing the at least one processor to: generate a first score based on comparing categorical transaction parameters of the first plurality of transaction parameters to categorical transaction parameters of the plurality of transaction parameters associated with each of the historical payment transactions in the second subset; generate a second score based on comparing numerical transaction parameters of the first plurality of transaction parameters to numerical transaction parameters of the plurality of transaction parameters associated with each of the historical payment transactions in the second subset; and generate the similarity score as a composite of the first score and the second score.

Clause 26: The computer program product of any of clauses 23-25, wherein the second subset does not include all of the historical payment transactions in the plurality of historical payment transactions, and the subset does not include all of the historical payment transactions in the second subset.

Clause 27: The computer program product of any of clauses 23-26, wherein the first authorization decision was generated by a transaction processing system of a transaction service provider acting on behalf of an issuer system of an issuer.

Clause 28: The computer program product of any of clauses 23-27, wherein the first authorization decision was generated by the transaction processing system while the issuer system failed to communicate with an electronic payment processing network.

Clause 29: The computer program product of any of clauses 23-28, wherein the first authorization decision was generated by the transaction processing system by applying the first plurality of transaction parameters to a black box machine-learning model, wherein the black box machine-learning model is generated based on modeling historical authorization decisions of the issuer system.

Clause 30: The computer program product of any of clauses 23-29, wherein the first authorization decision was generated by the transaction processing system based on historical transaction data associated with a user initiating the first payment transaction.

Clause 31: The computer program product of any of clauses 23-30, wherein the first authorization decision comprises an authorization decline, and the authorization decision for each historical payment transaction in the subset comprises an authorization approval.

Clause 32: The computer program product of any of clauses 23-31, wherein the impact parameter at least partially caused generation of the first authorization decision different from the authorization decisions of the plurality of historical payment transactions in the subset.

Clause 33: The computer program product of any of clauses 23-32, wherein the program instructions, when executed by a user device, cause the user device to: display data associated with the first payment transaction and a selectable element associated with the data associated with the first payment transaction; receive user input indicating selection of the selectable element; and in response to selection of the selectable element, generate and transmit the inquiry request message.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 8 is a look-up table associating an impact parameter with an user-interpretable inquiry response message, according to some non-limiting embodiments or aspects;

DETAILED DESCRIPTION

Figure 1:
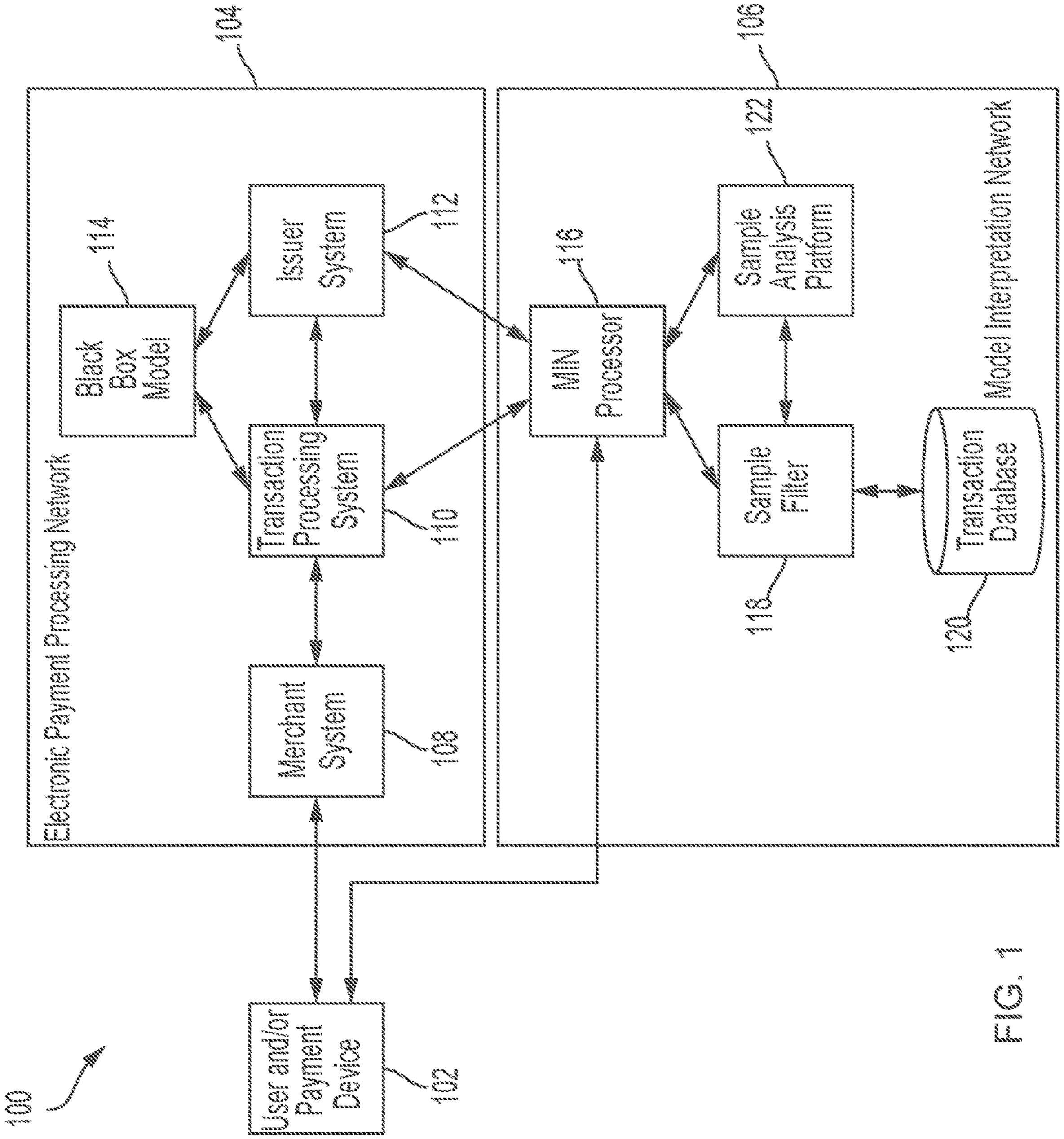
FIG. 1 is a schematic diagram of a system for interpreting black box models for payment authorization decisions, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "account identifier" may include one or more primary account numbers (PAN), tokens, or other identifiers associated with a customer account. For example, account identifiers in Real Time Payment (RTP) transactions may include identifiers for sender accounts (called debtor accounts) and identifiers for receiver accounts (called creditor accounts). Account identifiers may be alphanumeric or any combination of characters and/or symbols. Tokens may be associated with a PAN, debtor account identifier, creditor account identifier, or other original account identifier in one or more data structures (e.g., one or more databases, and/or the like) such that they may be used to conduct a transaction without directly using the original account identifier. In some examples, an original account identifier may be associated with a plurality of tokens for different individuals or purposes. As used herein, the term "real-time payment (RTP)" refers to a method of electronic funds transfer, allowing for almost or near immediate transfer of money between accounts, which is in contrast to the previous transfer times of one to three business days. For example, RTP means a payment transaction is not subjected to any waiting period, with funds being transferred and/or transactions being settled as soon as the payment transactions are processed by the RTP system.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa@ or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects described herein relate to systems, methods, and computer program products for interpreting black box models for payment authorization decisions that improve upon existing electronic payment systems. Non-limiting embodiments or aspects automatically interpret a payment authorization decision (a first authorization decision) associated with a first payment transaction generated by a black box machine learning model, in order to enhance transparency of the model. Non-limiting embodiments or aspects also enable users to monitor the model (to remedy any potential model errors, including updating and/or retraining the model), understand or learn from the model, and/or justify its payment authorization decision outcomes generated by the model, if challenged. Further, by enhancing the transparency of the model, modifications to payment processes may be made to reduce the amount of computational resources needed to perform such processes.

Non-limiting embodiments or aspects efficiently interpret the first authorization decision by analyzing only a relevant subset of the historical transactions in a sample database, as opposed to all historical transactions, reducing the processing requirements. This may be done by utilizing a sample filter to query a plurality of historical payment transactions to identify a subset of historical payment transactions comprising payment transactions having an authorization decision different from the first authorization decision of a first payment transaction. Non-limiting embodiments or aspects may further filter this subset to generate a second, narrower subset based on the generation of a similarity score indicating the relevance of the historical payment transactions in the subset to the first payment transaction. This second subset may be analyzed in more detail (e.g., by inputting the data to a machine learning model) to determine an impact parameter which may be causing the generation of the first authorization decision different from the authorization decisions of the plurality of historical payment transactions in the subset or second subset. Non-limiting embodiments or aspects may generate an interpretable reason for the first authorization decision based on the impact parameter, in order to enhance transparency associated with the decisions generated by the black box model. Therefore, the system, method, and computer program product described herein enhances transparency of the black box machine learning model, enables user monitoring of the model allowing for remediation of errors, enables understanding or learning to be gleaned from the model, enables interpretable justification of the model's decisions, and/or improves upon existing payment processes while doing so in an efficient way that reduces the computing resources necessary for generating model interpretations.

Referring to FIG. 1, a system 100 is shown for interpreting "black box" models for payment authorization decisions according to non-limiting embodiments or aspects. As used herein, the terms "black box model" and "black box machine learning model" refer to a model that receives an input and generates an output based on the input and one or more processes unknown and/or not visible to an end-user. The system 100 may include a user device and/or payment device 102 (hereinafter referred to as user device 102) of a user engaging in electronic payment transactions with various merchants. The user device and payment device may be the same device or may be separate devices. The user device 102 may be used in conjunction with an electronic payment processing network 104 and/or a model interpretation network 106, which may also be components of the system 100.

The electronic payment processing network 104 may comprise a merchant system 108 associated with a merchant engaging in an electronic payment transaction with the user. The electronic payment processing network 104 may comprise a transaction processing system 110 and an issuer system 112 associated with the transaction service provider and issuer, respectively, associated with the user's payment device which initiated the electronic payment transaction. The electronic payment processing network 104 may comprise a black box model 114, which may be a machine learning model configured to generate authorization decisions for electronic payment transactions. The model interpretation network 106 may comprise a model interpretation network (MIN) processor 116, a sample filter 118, a transaction database 120, and a sample analysis platform 122, as examples.

With continued reference to FIG. 1, in some non-limiting embodiments or aspects, the user device 102 may engage with the electronic payment processing network 104 to process an electronic payment transaction between the user and a merchant to completion. This includes authorizing, clearing, and settling the electronic payment transaction. The user device 102 may communicate with the merchant system 108 associated with the merchant to initiate the electronic payment transaction. The merchant system 108 may communicate over the electronic payment processing network 104 with the transaction processing system 110 and the issuer system 112 associated with the transaction service provider and issuer, respectively, of the user's payment device to process the electronic payment transaction. This includes generating an authorization decision for the electronic payment transaction, which may be to authorize or decline the electronic payment transaction. The authorization decision for the electronic payment transaction may be to decline the electronic payment transaction.

The authorization decision may be generated by the issuer system 112. However, in some non-limiting embodiments or aspects, the transaction processing system 110 may "stand-in" for the issuer system 112 to generate the authorization decision (e.g., using a Stand in Processing (STIP) protocol). The transaction processing system 110 may stand-in to generate the authorization decision in an instance in which the issuer system 112 and/or the transaction processing system 110 have a connection issue, such as being unable to communicate with other components in the electronic payment processing network 104. For example, the issuer system 112 may have temporarily lost connection with the transaction processing system 110, such that the transaction processing system 110 generates the authorization decision on behalf of the issuer system 112 so that the payment transaction does not automatically fail.

With continued reference to FIG. 1, the issuer system 112 or the transaction processing system 110 generating the authorization decision may generate the authorization decision using the black box model 114. The black box model 114 may be a machine learning model. Any suitable type of machine learning model may be used as the black box model. In some non-limiting examples, the black box model 114 may comprise a recurrent neural network (RNN) implemented with long short-term memory (LSTM). The black box model 114 may use as inputs historical transaction data (e.g., in the transaction database 120) and data associated with the electronic payment transaction to generate the authorization decision. The black box model 114 may generate an authorization decision without generating a human-interpretable reason for the generated authorization decision. In some examples, the black box model 114 may output a result indicating that the payment transaction is authorized or declined without providing the reason behind that authorization decision. The authorization decision may be generated for the payment transaction during the check-out procedure of the payment transaction (e.g., at the time of the user engaging with the point-of-sale system). In response to the black box model 114 returning an approved authorization decision, the electronic payment transaction may automatically continue processing the transaction. In response to the black box model 114 returning a decline authorization decision, the electronic payment transaction may automatically be terminated.

The authorization decision may be communicated to the user device 102. For example, the user device 102 may display data associated with the electronic payment transaction, including data associated with whether it was authorized or declined. The user device 102 may also display a selectable element associated with the data of the electronic payment transaction, with which the user may engage on the user interface of the user device 102.

With continued reference to FIG. 1, in some non-limiting embodiments or aspects, the model interpretation network 106 may be invoked in order to interpret the authorization decision of the black box model 114 for the electronic payment transaction. To invoke the model interpretation network 106, the user may select the selectable element (e.g., provide user input) associated with the data of the electronic payment transaction on the user interface of the user device 102 to cause the user device 102 to generate an inquiry request message. The inquiry request message may also be generated in response to other inputs or events. The user device 102 may communicate the inquiry request message to the model interpretation network (MIN) processor 116 to initiate interpretation of the authorization decision of the black box model 114 for the electronic payment transaction. Additionally or alternatively, in some non-limiting embodiments or aspects, the transaction processing system 110, the issuer system 112, or some other system of the electronic payment processing network 104 may generate and transmit the inquiry request message to the MIN processor 116 to initiate interpretation of the authorization decision of the black box model 114 for the electronic payment transaction.

The inquiry request message may identify the electronic payment transaction and/or contain a plurality of transaction parameters associated with the electronic payment transaction, such as data elements specified in ISO 8583. The inquiry request message may further contain the authorization decision generated for the electronic payment transaction, such as that the transaction was approve or declined. In some non-limiting embodiments or aspects, the inquiry request message contains an authorization decision that the electronic payment transaction was declined.

In response to receiving the inquiry request message, the MIN processor 116 may communicate with the sample filter 118 to cause the sample filter 118 to query the transaction database 120 comprising transaction data associated with a plurality of historical payment transactions to identify a subset of historical payment transactions. The transaction database 120 may comprise a plurality of historical payment transactions by the user and other users, and the subset may comprise a smaller number of those historical payment transactions. The transaction data for each of the plurality of historical payment transactions may comprise a plurality of transaction parameters (e.g., data elements specified in ISO 8583) and an authorization decision. The subset of historical payment transactions may comprise payment transactions having an authorization decision different from the authorization decision of the electronic payment transaction (the subject transaction of the inquiry request message) and having a similarity score that satisfies a threshold (e.g., equal to and/or greater than a predetermined threshold value, equal to or less than a predetermined threshold value, within a predetermined threshold range, or the like).

In some non-limiting embodiments or aspects, the querying executed by the sample filter 118 comprises filtering a second subset of historical payment transactions from the plurality of historical payment transactions based on each historical payment transaction in the second subset comprising an authorization decision different from the authorization decision of the electronic payment transaction, and for each of the historical payment transactions in the second subset, generating a similarity score relative to the electronic payment transaction based on comparing the plurality of transaction parameters of the electronic payment transaction to the plurality of transaction parameters associated with each of the historical payment transactions in the second subset (e.g., by inputting the parameters into a machine learning model). As used herein, "relative to the electronic payment transaction" may mean that the similarity score for each historical payment transaction quantifies a similarity between that historical payment transaction and the electronic payment transaction. The subset of historical payment transactions may be identified as a subset of the second subset based on the similarity score for each payment transaction in the subset of historical payment transactions satisfying the threshold.

The similarity score for each historical payment transaction may be generated according to any suitable algorithm for determining similarity between the electronic payment transaction and the historical payment transactions. In some non-limiting embodiments or aspects, generating the similarity score comprises generating a first score based on comparing categorical transaction parameters of the plurality of transaction parameters of the electronic payment transaction to categorical transaction parameters of the plurality of transaction parameters associated with each of the historical payment transactions in the second subset (e.g., as inputs to a machine learning model), generating a second score based on comparing numerical transaction parameters of the plurality of transaction parameters of the electronic payment transaction to numerical transaction parameters of the plurality of transaction parameters associated with each of the historical payment transactions in the second subset (e.g., as inputs to a machine learning model), and generating the similarity score as a composite of the first score and the second score.

A numerical parameter may be a parameter having a numerical value in which the numerical value is associated with an amount associated with the parameter (e.g., transaction amount). A categorical parameter may be a parameter in which the value of the parameter designates the category to which the value is associated (e.g., card present or card not present transaction). A categorical parameter may have a numerical value associated with it, but that numerical value may not be associated with an amount associated with the parameter (e.g., the number of a merchant category code refers to a category of goods or services of the merchant and not an amount). The transaction parameters may include those specified as a data element in ISO 8583.

With continued reference to FIG. 1, in some non-limiting embodiments or aspects, the output of the sample filter 118 (e.g., the subset or second subset) may comprise the input to the sample analysis platform 122. The sample analysis platform 122 may comprise a machine learning model. The sample analysis platform 122 may comprise the same type of machine learning model as the black box model 114. In some non-limiting examples, the sample analysis platform 122 may comprise an RNN with LSTM. The sample analysis platform 122 (e.g., the machine learning model thereof) may analyze the subset and/or second subset to determine at least one impact parameter of the plurality of transaction parameters of the electronic payment transaction by comparing the plurality of transaction parameters of the electronic payment transaction with the plurality of transaction parameters associated with the plurality of historical payment transactions in the subset and/or second subset. The comparison of the plurality of transaction parameters of the electronic payment transaction with the plurality of transaction parameters associated with the plurality of historical payment transactions in the subset and/or second subset may be compared to determine the impact parameter by inputting such data into the machine learning model. The at least one impact parameter may be a parameter which at least partially caused generation of the authorization decision of the electronic payment transaction to be different from the authorization decisions of the plurality of historical payment transactions in the subset and/or second subset. The at least one impact parameter may be said to have at least partially caused generation of the authorization decision of the electronic payment transaction to be different from the authorization decisions of the plurality of historical payment transactions in the subset and/or second subset when an algorithm generated by the sample analysis platform 122 associates the at least one impact parameter with a weight satisfying a threshold (e.g., that the parameter had an impact on the decision and was significant enough to satisfy a threshold). Causing the generation of the authorization decision of the electronic payment transaction to be different from the authorization decisions of the plurality of historical payment transactions in the subset and/or second subset may mean that should the identified impact parameter or combination of impact parameters have been a different value(s) while maintaining the values of the other transaction parameters, the authorization decision generated by the black box model 114 may have been different (e.g., authorization approved instead of authorization declined). The at least one impact parameter may be a single transaction parameter, a combination of transaction parameters, and/or a composite parameter derived from at least one transaction parameter.

With continued reference to FIG. 1, in some non-limiting embodiments or aspects, the MIN processor 116 may generate an inquiry response message based on the at least one impact parameter. The inquiry response message may comprise at least one interpretable reason for the authorization decision of the electronic payment transaction. An interpretable reason may be an explanation that is understandable by the user through text, audio, images, and/or the like, without requiring review or understanding of source mode, model architecture, model parameters, and/or the like. The model interpretation network 106 may automatically associate (e.g., associate without human intervention and in response to a determination or other trigger event) determined impact parameters with interpretable reasons so as to make the authorization decision of the black box model 114 more transparent for the user. The MIN processor 116 may transmit the inquiry response message to the device which communicated the inquiry request message (e.g., the user device 102, the transaction processing system 110, the issuer system 112, and the like). In some examples, the interpretable reason(s) may include, or may be used to automatically generate, one or more modified payment processes or suggestions for modifying a payment process to improve a positive authorization rate of future transactions. In some examples, the interpretable reason(s) may include, or may be used to further train, the black box model 114.

Figure 2:
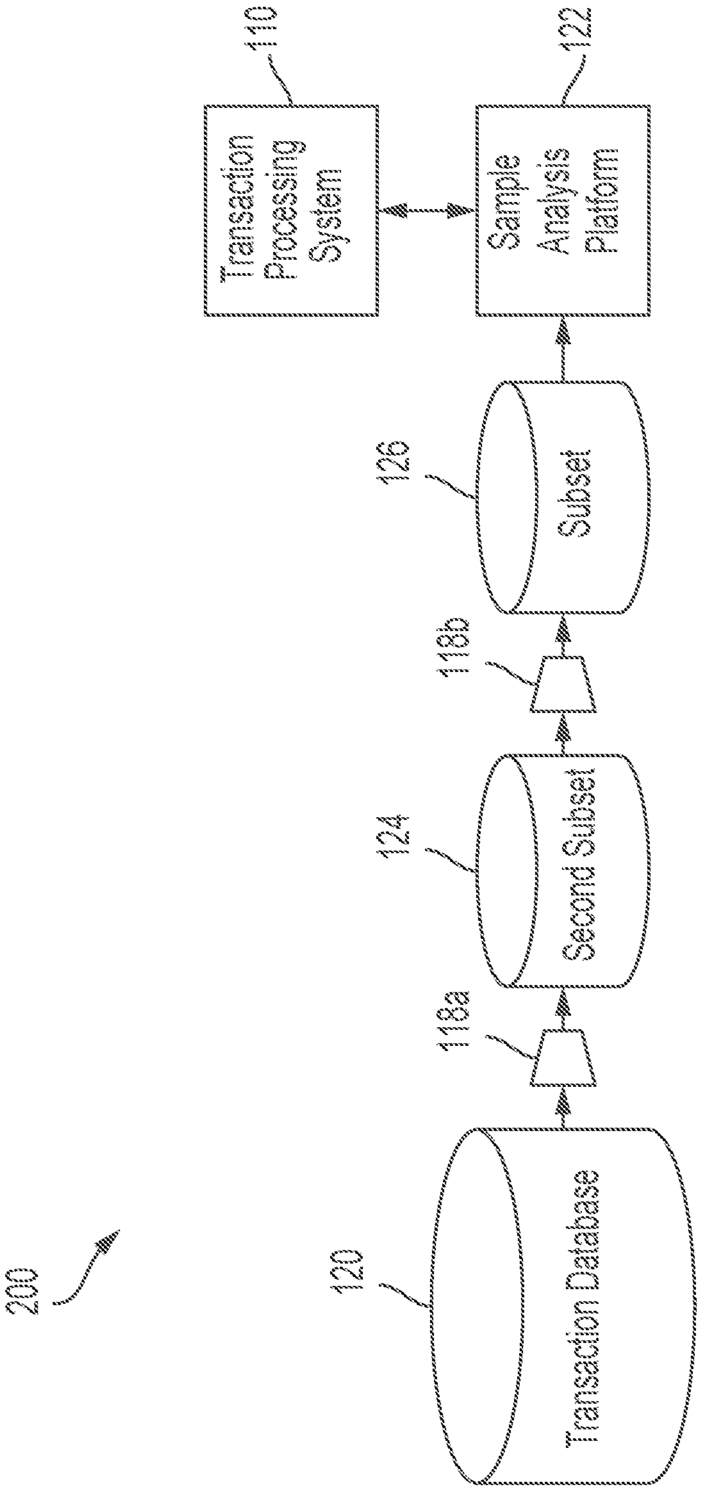
FIG. 2 is a schematic diagram of a system for interpreting black box models for payment authorization decisions, according to some non-limiting embodiments or aspects.

Referring to FIG. 2, a system 200 is shown for interpreting black box models for payment authorization decisions according to some non-limiting embodiments or aspects. The system 200 may interpret the authorization decision from the black box model (114 from FIG. 1) for an electronic payment transaction, for example where the authorization decision was to decline the electronic payment transaction.

The system 200 may include the transaction database 120 including historical transaction data associated with historical electronic payment transactions. The historical transaction data may comprise a plurality of transaction parameters and an authorization decision for each historical payment transaction. The system 200 may further comprise one or more filters 118*a*, 118*b* to generate one or more subsets of historical payment transactions, which subsets contain fewer historical payment transaction than the transaction database 120.

Figure 3:
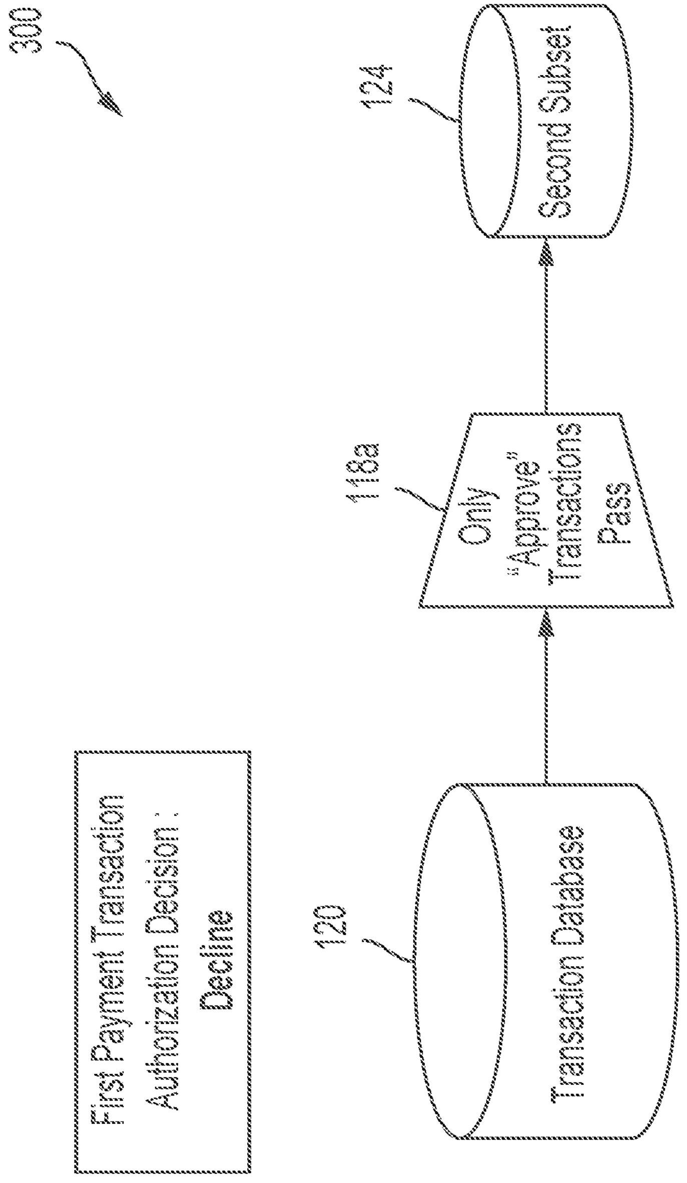
FIG. 3 is a schematic diagram of a system for filtering transaction data, according to some non-limiting embodiments or aspects.

Referring to FIG. 3, a system 300 is shown for filtering transaction data according to some non-limiting embodiments or aspects. The system 300 is a portion of the system 200 from FIG. 2. A first filter 118*a* may be applied to the transaction database 120 to generate a second subset of transactions and store the second subset of transactions in a second subset database 124. The historical payment transactions stored in the second subset database 124 may contain only payment transactions which have an authorization decision different from the authorization decision of the electronic payment transaction. The second subset database 124 may not include all of the historical payment transactions stored in the transaction database 120. For example, with the decision of the electronic payment transaction being an authorization decline, the second subset database 124 may contain only payment transactions which have an authorization approved authorization decision and may omit other payment transactions.

Figure 4:
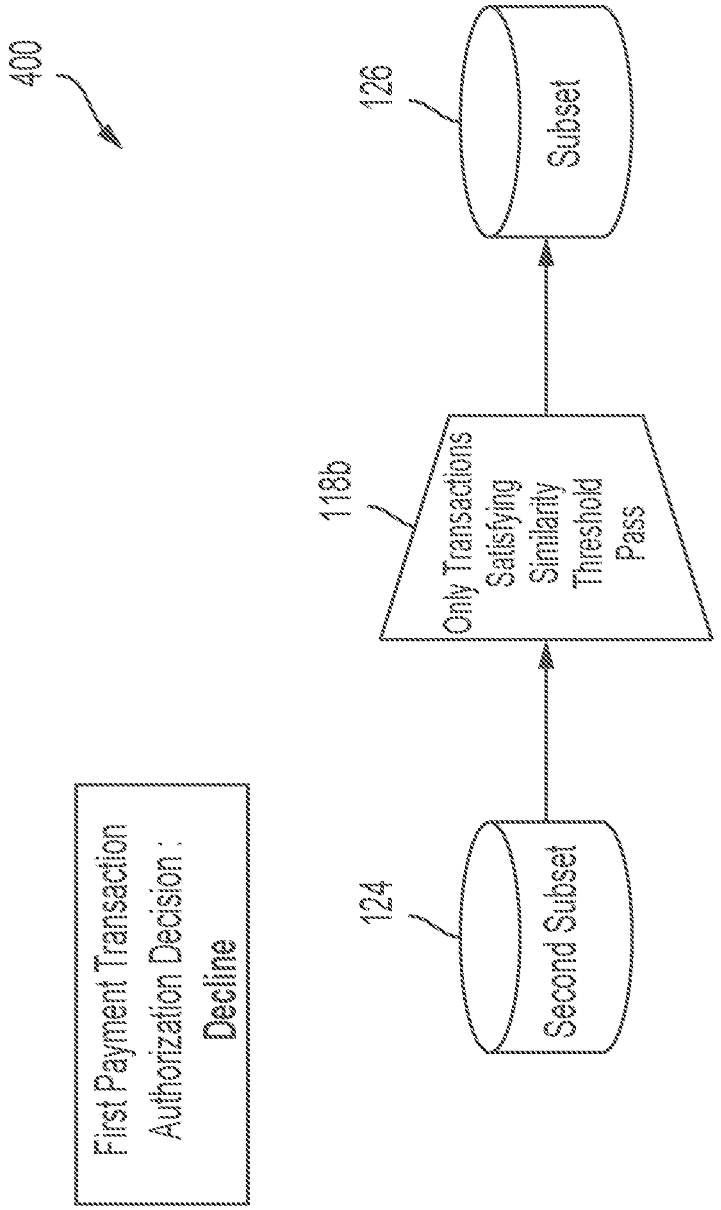
FIG. 4 is a schematic diagram of a system for further filtering transaction data according to some non-limiting embodiments or aspects.

Referring to FIG. 4, a system 400 is shown for further filtering transaction data, according to some non-limiting embodiments or aspects. The system 400 is a portion of the system 200 from FIG. 2. A second filter 118*b* may be applied to the second subset database 124 to generate a subset of historical payment transactions which contain fewer payment transactions than the second subset database 124. The second filter 118*b* may input historical transaction data for the historical payment transactions contained in the second subset database 124 and the transaction data associated with the electronic payment transaction into a machine learning model to generate a similarity score for each of the historical payment transactions contained in the second subset database 124. Any suitable machine learning model may be used to generate the similarity scores, and in some examples, the machine learning model may be of the same type as the machine learning model of the black box model 114.

The similarity score may be a numerical score quantifying a degree of similarity between a historical payment transaction and the electronic payment transaction. The subset generated by the second filter 118*b* may only contain historical payment transactions having a similarity score that satisfies a threshold, and these historical payment transactions in the subset may be stored in a subset database 126. The subset database 126 may not include all of the historical payment transactions stored in the second subset database 124. The historical payment transactions in the subset database 126 may be the payment transactions determined by the filters 118*a*, 118*b* to be most similar to the electronic payment transaction while having the opposite authorization decision thereof.

Referring again to FIG. 2, the historical payment transactions in the subset database 126 and the transaction data associated with the electronic payment transaction may be input to the sample analysis platform 122 (e.g., the machine learning model thereof) to interpret the black box model's 114 payment authorization decision for the electronic payment transaction. The transaction data associated with the electronic payment transaction may be received from the transaction processing system 110 or another component from the electronic payment processing network (104 from FIG. 1). The sample analysis platform 122 may analyze the input to determine at least one impact parameter. Determining the at least one impact parameter may comprise the machine learning model of the sample analysis platform 122 generating a score for each transaction parameter, and the score may represent the impact (e.g., weight) that parameter has on the authorization decision generated for the electronic payment transaction. The impact parameter(s) may be determined by comparing the scores for each parameter to determine which parameter(s) most strongly impacted the authorization decision generated for the electronic payment transaction, such as by having the highest or lowest score(s). The score may satisfy a threshold in order for the score to be determined to be an impact parameter.

Figure 5:
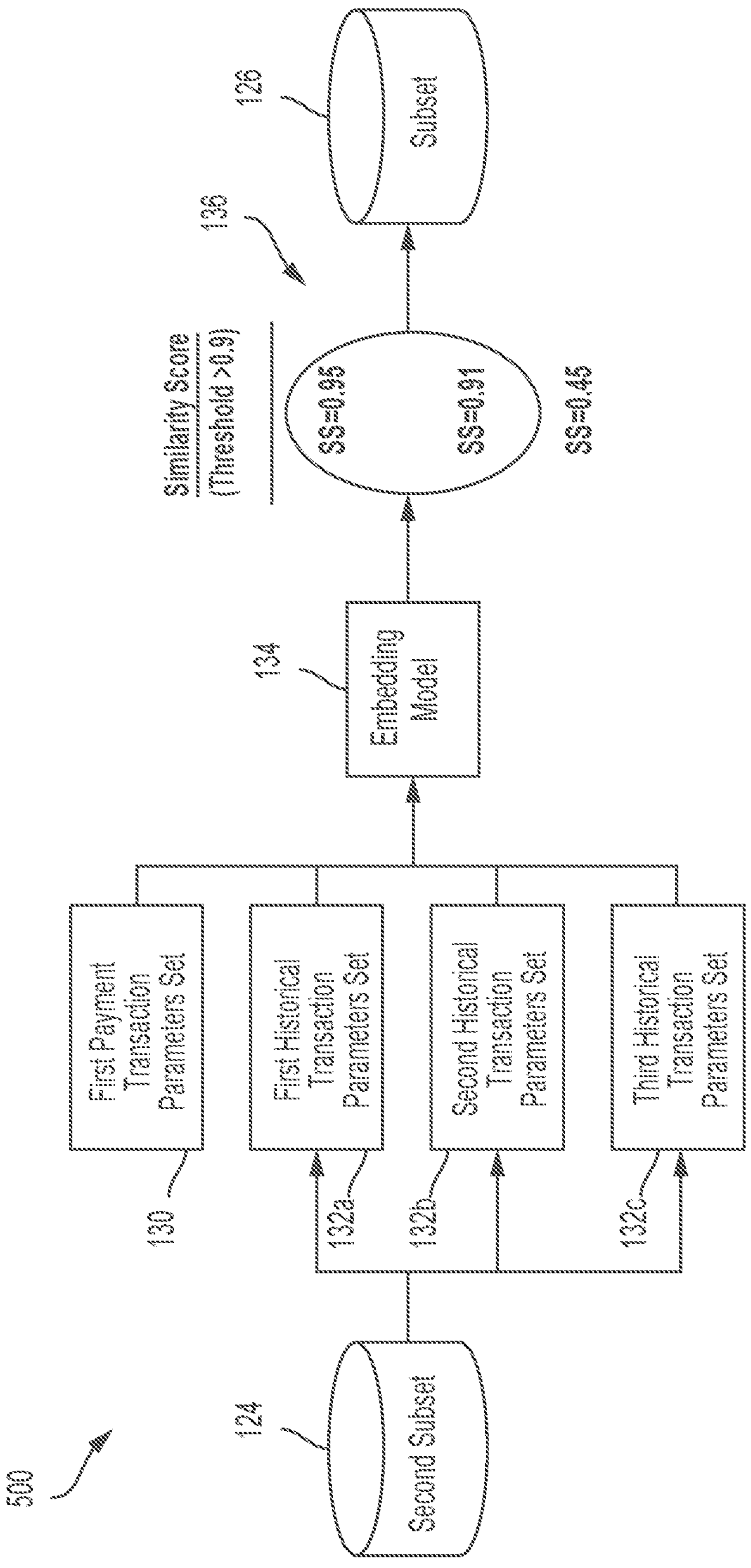
FIG. 5 is a schematic diagram of a system for generating a similarity score, according to some non-limiting embodiments or aspects.

Referring to FIG. 5, a system 500 is shown for generating a similarity score, according to some non-limiting embodiments or aspects. The system 500 may include the second subset database 124 (as described in FIGS. 2-4) containing only payment transactions which have an authorization decision different from the authorization decision of the electronic payment transaction (e.g., containing only authorization approved authorization decisions when the electronic payment transaction has an authorization declined authorization decision).

The second subset database 124 may comprise a plurality of historical transactions (e.g., the first, second and third historical transactions) having an authorization decision different from the electronic payment transaction (e.g., first payment transaction). The electronic payment transaction may have a plurality of transaction parameters contained in a first payment transaction parameters set 130. The plurality of historical transactions may each have a plurality of transaction parameters contained, respectively, in a first, second, and third historical transaction parameters set 132*a*-*c*.

With continued reference to FIG. 5, the first payment transaction parameters set 130 and the first, second, and third historical transaction parameters set 132*a*-*c* may be input to a machine learning model, such as an embedding model 134. The embedding model 134 may generate embedding vectors for each historical transaction. The first payment transaction parameters set 130 may be analyzed by the embedding model 134 based on the embedding vectors generated for each historical transaction to generate a similarity score 136 for each historical transaction. The similarity scores 136 may quantify the degree of similarity between the historical payment transaction and the electronic payment transaction. The similarity scores 136 generated for each historical payment transaction may be compared to a threshold (e.g., determined by the model, predetermined, and/or specified by a user) to determine the historical payment transactions to be stored in the subset database 126 (as described in connection with FIGS. 2 and 4). For example, transactions having scores satisfying a threshold (e.g., meeting or exceeding a threshold) may be stored in the subset database 126.

In the non-limiting example shown in FIG. 5, the threshold is defined as a similarity score of greater than 0.9 for the historical transaction to be stored in the subset database 126. The embedding model 134 generated similarity scores 136 for the first, second, and third historical transactions of 0.95, 0.91, and 0.45, respectively. Thus, the first and second historical transactions (similarity scores 136 thereof) satisfied the threshold and were stored in the subset database 126 while the third historical transaction did not satisfy the threshold and was not stored in the subset database 126.

Figure 6:
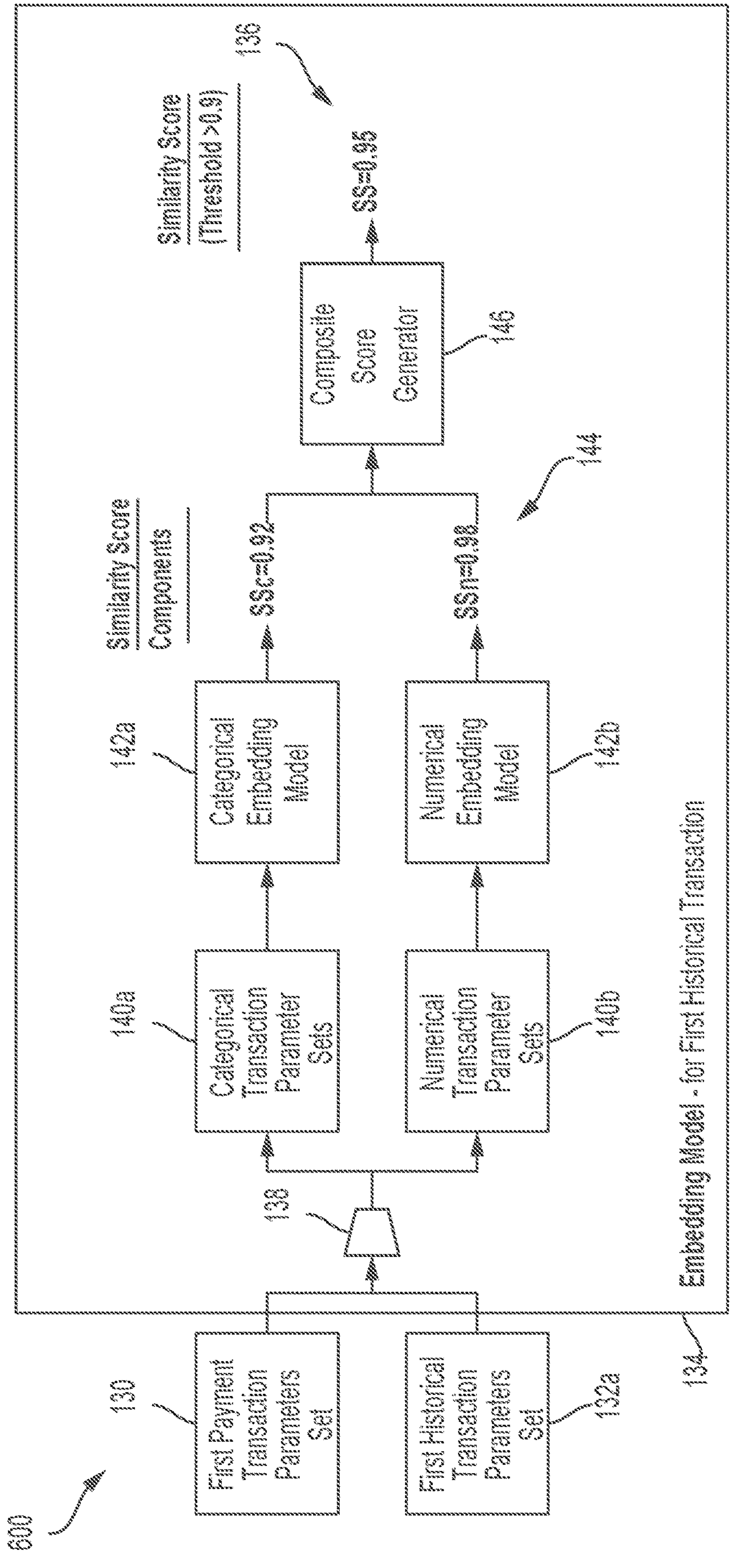
FIG. 6 is a schematic diagram of a system for generating a similarity score, according to some non-limiting embodiments or aspects.

Referring to FIG. 6, a system 600 is shown for generating a similarity score, according to some non-limiting embodiments or aspects. The system 600 may generate the similarity score 136 for the first historical transaction having the first historical transaction parameters set 132*a* (as described in connection with FIG. 5). The system 600 may input the first payment transaction parameters set 130 and the first historical transaction parameters set 132*a* into a parameters filter 138. The parameters filter 138 may separate the parameters into categorical transaction parameters and numerical transaction parameters, such that the first historical transaction parameters set 132*a* and/or the first payment transaction parameters set 130 are each filtered into categorical transaction parameter sets 140*a* and numerical transaction parameter sets 140*b*. It will be appreciated that the other historical transactions (e.g. the second and third historical transactions) may similarly be filtered into separate categorical and numerical components.

With continued reference to FIG. 6, the system 600 may include a first machine learning model, such as a categorical embedding model 142*a*, which analyzes the categorical transaction parameter sets 140*a*, and a second machine learning model, such as a numerical embedding model 142*b*, which analyzes the numerical transaction parameter sets 140*a*. The categorical embedding model 142*a* and the numerical embedding model 142*b* may be separate machine learning models or integrated and combined into the same machine learning model or model framework. The categorical embedding model 142*a* and the numerical embedding model 142*b*, like the embedding model 134 (from FIG. 5), may generate embedding vectors for historical transactions.

The categorical transaction parameters sets 140*a* may be input to the categorical embedding model 142*a* to cause the categorical embedding model 142*a* to generate embedding vectors for each historical transaction based on the categorical parameters thereof. The categorical transaction parameters of the first payment transaction may be analyzed by the categorical embedding model 142*a* against the categorical embedding vectors generated for each historical transaction to generate a component categorical similarity score SSc 144 for each historical transaction, which categorical similarity scores SSc 144 quantify the degree of similarity between the categorical parameters of the historical payment transaction and the electronic payment transaction.

The numerical transaction parameters sets 140*b* may be input to the numerical embedding model 142*b* to cause the numerical embedding model 142*b* to generate embedding vectors for each historical transaction based on the numerical parameters thereof. The numerical transaction parameters of the first payment transaction may be analyzed by the numerical embedding model 142*b* against the numerical embedding vectors generated for each historical transaction to generate a component numerical similarity score SSn 144 for each historical transaction, which numerical similarity scores SSn 144 quantify the degree of similarity between the numerical parameters of the historical payment transaction and the electronic payment transaction.

With continued reference to FIG. 6, the component similarity scores 144 (e.g., SSc and SSn) may be input to a composite score generator 146 to generate the similarity score 136. The similarity score 136 may be a composite of the component similarity scores 144. The similarity score 136 being a "composite" may mean that it is a function of each of the of component similarity scores 144. The composite score generator 146 may combine the component similarity scores 144 in any suitable way to generate the similarity score 136. For example, the component score generator 146 may take an average of the component scores 144, a weighted average of the component scores 144, apply a machine learning model to generate weights for the categorical and numerical components, and the like.

In the non-limiting example of FIG. 6, the component similarity scores 144 and the similarity score 136 for the first historical transaction are generated. The categorical embedding model 142*a* generated a categorical component similarity score 144 SSc of 0.92, while the numerical embedding model 142*b* generated a numerical component similarity score 144 SSn of 0.98. Based on the component similarity scores 144 for the first historical transaction, the composite score generator 146 generated a similarity score of 0.95.

Figure 7:
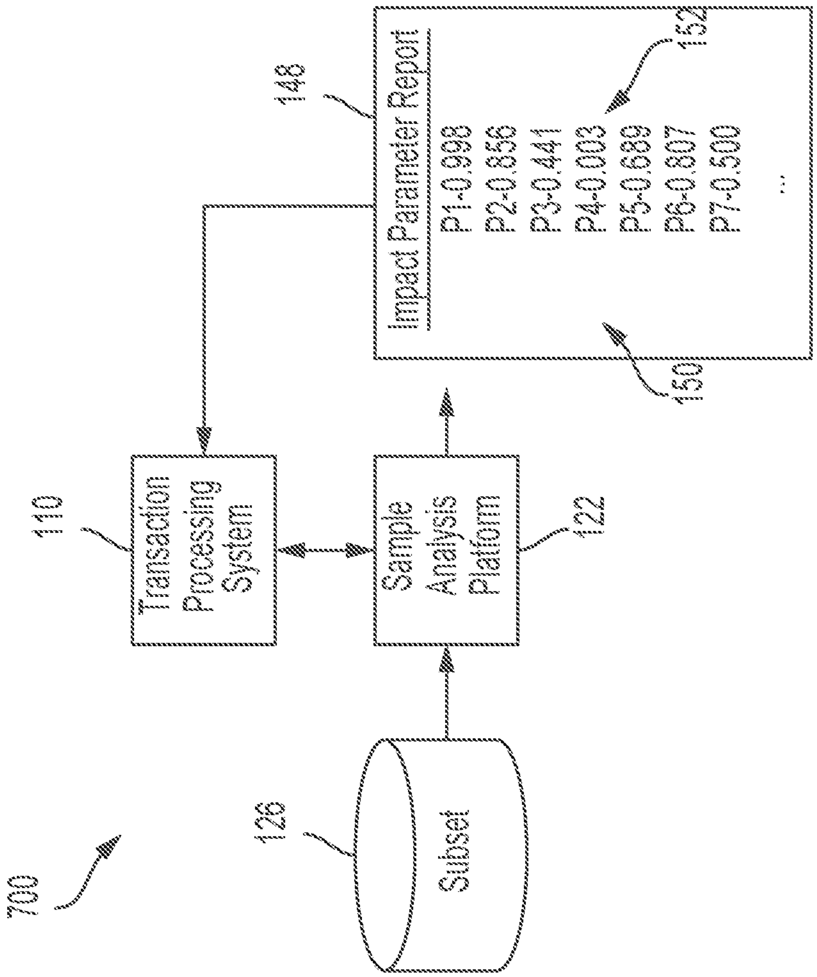
FIG. 7 is a schematic diagram of a system for determining at least one impact parameter, according to some non-limiting embodiments or aspects.

Referring to FIG. 7, a system 700 is shown for determining at least one impact parameter, according to some non-limiting embodiments or aspects. The transaction processing system 110 may communicate the transaction parameters associated with the electronic payment transaction being analyzed to the sample analysis platform 122 (e.g., the machine learning model thereof). The historical transactions determined to be most relevant to the electronic payment transaction (based on the similarity scores) may be stored in the subset database 126. The subset database 126 may communicate the historical transactions (e.g., the embeddings and/or parameters thereof) stored therein to the sample analysis platform 122.

The sample analysis platform 122 may apply the machine learning model to the electronic payment transaction based on the inputs of the parameters of the electronic payment transaction and the embeddings and/or parameters of the historical transactions from the subset database 126 in order to generate an impact parameter report 148. The impact parameter report may comprise a listing of the parameters 150 (e.g., P1-P7), each parameter 150 associated with a parameter score 152. The machine learning model of the sample analysis platform 122 may generate the parameter score 152 for each parameter 150. The parameter score 152 may represent the impact (e.g., weight) that parameter 150 had on the authorization decision generated for the electronic payment transaction.

The parameter score 152 may be in any form, such as a numerical score quantifying the impact the parameter 150 had on the authorization decision generated for the electronic payment transaction. For example, as shown in FIG. 7, the parameter score 152 is a number between 0 and 1, with higher numbers denoting parameters with a more significant impact on the authorization decision and lower number denoting parameters with a less significant impact on the authorization decision. Thus, in this example, parameter 150 P1 having a parameter score 152 of 0.998 is determined by the sample analysis platform 122 to have the most significant impact on the authorization decision generated for the electronic payment transaction.

At least one impact parameter may be determined based on the parameter score 152 associated with each parameter 150. For example, the impact parameter may be the parameter 150 having the parameter score 152 indicating the most significant impact on the authorization decision generated for the electronic payment transaction. A plurality of impact parameters may be determined with the impact parameters being the parameters 150 having the parameter scores 152 indicating the most significant impact on the authorization decision generated for the electronic payment transaction. The impact parameter(s) may be determined by comparing the parameter score 152 for each parameter 150 to a threshold score (e.g., defined by the model and/or a user) to determine which parameter(s) 150 have parameter score(s) 152 satisfying (e.g., meeting and/or exceeding) the threshold. Parameters 150 with parameters scores 152 satisfying the threshold may be determined to be impact parameters.

With continued reference to FIG. 7, the sample analysis platform 122 may communicate the impact parameter report 148 to the transaction processing system 110, another component of the electronic payment processing network 104, or the user device 102 (shown in FIG. 1). The sample analysis platform 122 may communicate the entire impact parameter report 148 or only communicate the determined impact parameters.

Referring to FIG. 8, a look-up table 800 is shown which associates a parameter 150 or a combination of parameters 150 with a user-interpretable inquiry response message 154 according to some non-limiting embodiments or aspects. An inquiry response message may be communicated in response to receiving an inquiry request message, and the inquiry response message may provide a user-interpretable explanation as to the reason for the authorization decision of the electronic payment transaction in the inquiry request message. For example, the inquiry response message may contain a user-interpretable explanation as to why the electronic payment transaction was declined.

The look-up table 800 may associate each parameter 150 (e.g., a potential impact parameter) with a user-interpretable inquiry response message 154 that provides an explanation understandable by the user as to the reason for the authorization decision for the electronic payment transaction. Combinations of parameters 150 (e.g., P1+P3) simultaneously being impact parameters may have an associated inquiry response message 154.

In response to determining the impact parameter(s), the system may invoke the look-up table 800 to determine the inquiry response message 154 based on the impact parameter(s). For example, in response to determining that the impact parameter is P1 (e.g., transaction amount), the inquiry response message may be transmitted which contains the user-interpretable inquiry response message 154 of "The transaction was declined based on an excessively high transaction amount" and/or an image (such as an icon representing a high transaction amount). In some non-limiting examples, the user-interpretable inquiry response message 154 may contain an identification of the impact parameter, such as "Transaction Amount" or "Data Field 4" (from ISO 8583). The inquiry response message 154 being "user-interpretable" may mean that a trained user (e.g., sufficiently trained on the potential messages that can be contained in inquiry response messages 154 and their corresponding meaning) could understand the reason for the authorization decision for the electronic payment transaction based on the contents of the inquiry response message 154.

Figure 9A:
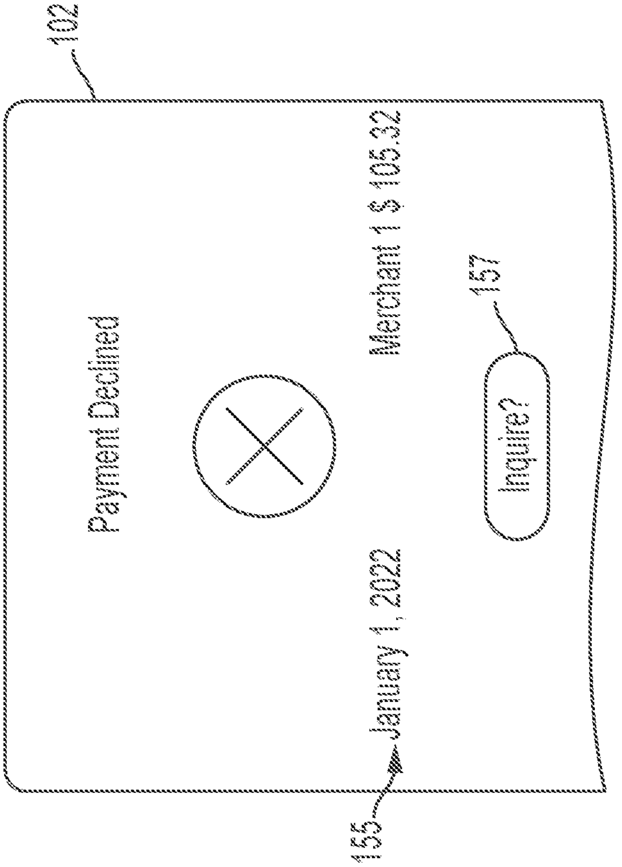
FIG. 9A is user interface on a user device for generating and communicating an inquiry request message, according to some non-limiting embodiments or aspects.

Referring to FIG. 9A, a user interface on a user device 102 is shown for generating and communicating an inquiry request message according to some non-limiting embodiments or aspects. The user device 102 may display an identification 155 of an electronic payment transaction along with an authorization decision therefor. For example, the user device 102 in FIG. 9A identifies a payment transaction conducted on Jan. 1, 2022 at Merchant 1 for $105.32 as being declined. The user interface of the user device 102 may also display a selectable element 157 enabling the user to inquire about the reason for the decline authorization decision for the electronic payment transaction. The user device 102 may receive a user input indicating that the user selected the selectable element 157. In response to selection of the selectable element 157, the user device 102 may generate and communicate the inquiry request message to initiate interpretation of the authorization decision of the black box model 114 (from FIG. 1) for the electronic payment transaction. The communication of the inquiry request message may cause the receipt of the inquiry response message after interpretation of the authorization decision of the black box model 114 for the electronic payment transaction.

Figure 9B:
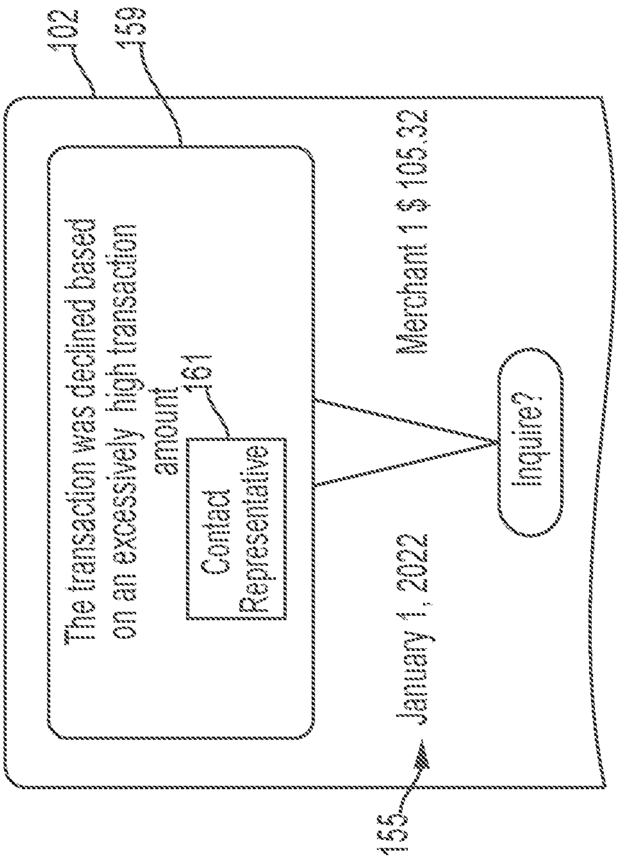
FIG. 9B is user interface on a user device for displaying an inquiry response message, according to some non-limiting embodiments or aspects.

Referring to FIG. 9B, a user interface on a user device 102 is shown for displaying an inquiry response message 159, according to some non-limiting embodiments or aspects. The displayed inquiry response message 159 may display a user-interpretable reason for the authorization decision made by the black box model 114 (from FIG. 1) for the electronic payment transaction. The user device may also display a selectable element 161 that enables the user to initiate contact with a representative in response to receiving the displayed inquiry response message 159. This selectable element 161 may allow the user to engage with a representative to further inquire about the electronic payment transaction and/or the authorization decision generated therefor. It will be appreciated that the user-interpretable reason for the authorization decision may be communicated in any way to a user, through audio (e.g., speech through prerecorded messages, text-to-speech, and/or the like) and/or images (e.g., icons, charts, and/or the like).

Figure 10:
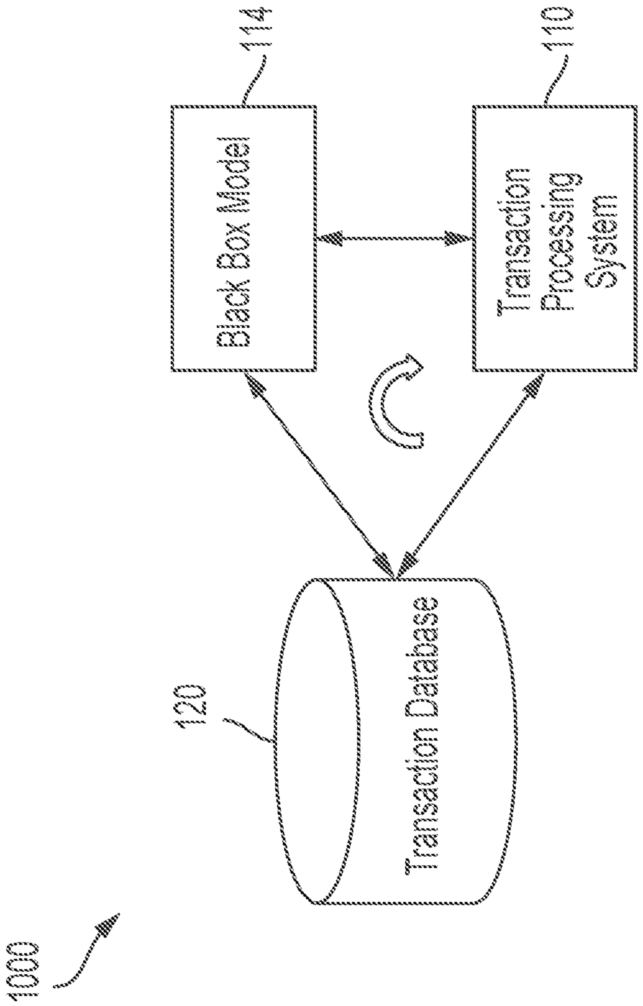
FIG. 10 is a schematic diagram of a system for updating and/or retraining a black box model, according to some non-limiting embodiments or aspects.

Referring to FIG. 10, a system 1000 is shown for updating and/or retraining a black box model 114 according to some non-limiting embodiments or aspects. Because the systems described herein interpret authorization decisions made by the black box model 114 and generate and display user-interpretable reasons for those authorization decisions, defects and/or undesirable results in the processes followed by the black box model 114 to generate authorization decisions may be detected. For example, a user may determine that a user-interpretable reason determined for the black box model's 114 authorization decision is inadequate or incorrect, such that it is warranted to modify the black box model 114 so that the black box model 114 generates the correct authorization decision in similar situations in the future.

The black box model 114 may be updated and/or retrained in response to identifying an incorrect reason for the generated authorization decision. The black box model 114 may be updated and/or retrained using transactions in the transaction database 120 (and/or the second subset database 124 and/or the subset database 126) and/or the electronic payment transaction for which the black box model generated the incorrect authorization decision. The transaction database 120 and/or the transaction processing system 110 may communicate the transaction data to be used to update and/or retrain the black box model 114. This protocol of updating and/or retraining the black box model 114 in response to identifying an error thereof may improve the accuracy of future decisions generated by the black box model 114.

Figure 11:
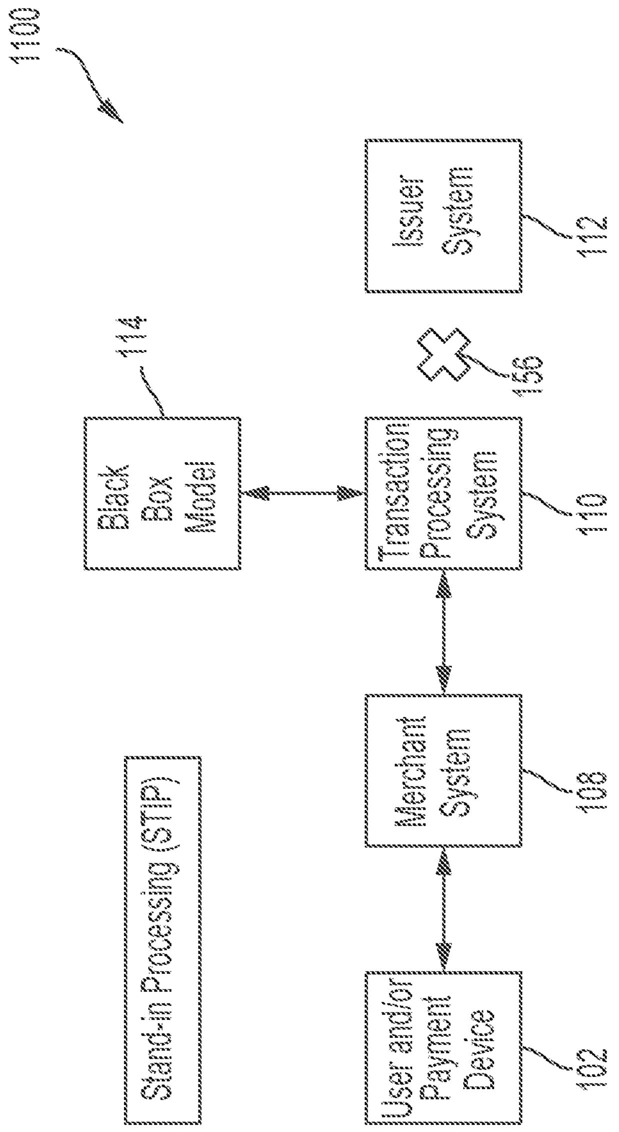
FIG. 11 is a schematic diagram of a system for processing an electronic payment transaction using a stand-in processing (STIP) protocol, according to some non-limiting embodiments or aspects.

Referring to FIG. 11, a system 1100 is shown for processing an electronic payment transaction using a STIP protocol, according to some non-limiting embodiments or aspects. The user device 102 may communicate with the merchant system 108 associated with the merchant to initiate the electronic payment transaction. The merchant system 108 may communicate a transaction message to the transaction processing system 110 to request that the electronic payment processing network (104 from FIG. 1) process the electronic payment transaction, which includes generating an authorization decision for the electronic payment transaction, which may be to authorize or decline the electronic payment transaction. When the transaction is processed outside the STIP protocol, the transaction processing system 110 generates and communicates an authorization request to the issuer system 112 to cause the issuer system 112 to generate an authorization decision for the electronic payment transaction. The issuer system 112 may then generate and communicate an authorization response containing the authorization decision to the transaction processing system 110, which continues processing of the electronic payment transaction.

In some non-limiting embodiments or aspects, the STIP protocol may be invoked to cause the transaction processing system 110 to "stand-in" for the issuer system 112 to generate the authorization decision. The STIP protocol may be invoked in an instance in which the issuer system 112 and/or the transaction processing system 110 have a connection issue 156. Due to the connection issue 156, the issuer system 112 may fail to communicate over the electronic payment processing network (104 from FIG. 1), such as with the transaction processing system 110 thereof. For example, the transaction processing system 110 may not be able to communicate with the issuer system 112, or the transaction processing system 110 has failed to receive a response from the issuer system within a predetermined period of time. According to the STIP protocol, the transaction processing system 110 generates the authorization decision on behalf of the issuer system 112 so that the electronic payment transaction does not automatically fail.

With continued reference to FIG. 11, the transaction processing system 110 may generate the authorization decision on behalf of the issuer system 112 by communicating with the black box model 114. The transaction processing system 110 may input parameters associated with the electronic payment transaction to the black box model 114, and the black box model 114 may generate an authorization decision based on the input. The authorization decision may be to authorize or decline the electronic payment transaction. In response to receiving the authorization decision from the black box model 114, the transaction processing system 110 may continue processing of the electronic payment transaction (without consulting the issuer system 112 for an authorization decision).

Figure 12:
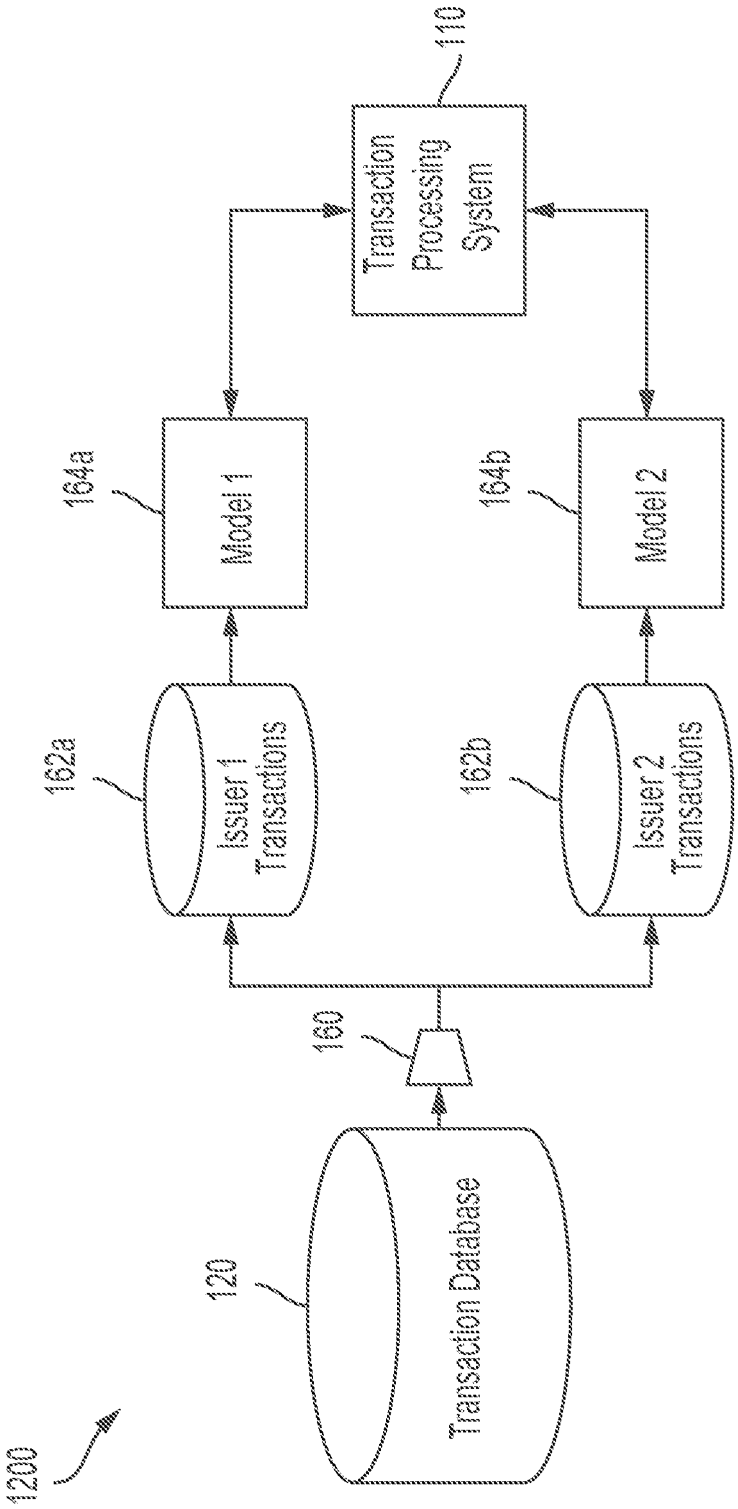
FIG. 12 is a schematic diagram of a system for processing an electronic payment transaction using a STIP protocol, according to some non-limiting embodiments or aspects.

Referring to FIG. 12, a system 1200 is shown for processing an electronic payment transaction using a STIP protocol, according to some non-limiting embodiments or aspects. As described herein, in the STIP protocol the transaction processing system generates the authorization decision on behalf of the issuer system so that the electronic payment transaction does not automatically fail. In some non-limiting embodiments or aspects, the transaction processing system may customize and/or modify its authorization decision based on the identity of the issuer system associated with the electronic payment transaction in order to attempt to match (e.g., predict and/or reproduce) its authorization decision to the authorization decision that would have been generated by the issuer system if available. This may be done by modeling the historical authorization decision behavior of the issuer system as described herein.

With continued reference to FIG. 12, for the electronic payment transaction, the system 1200 may determine the identity of the issuer system that issued the user device to the user to initiate the electronic payment transaction in order to determine which historical payment transactions to model. The transaction database 120 may comprise transaction data for historical payment transactions associated with a plurality of different issuers (e.g., including transactions associated with Issuer 1 and Issuer 2).

An issuer filter 160 may be applied to the transaction database 120 to separate the historical payment transactions by the issuer system associated therewith. The records identified with the issuer filter 160 associated with Issuer 1 may be automatically stored in a first issuer database **162*a* and records associated with Issuer 2 in a second issuer database 162*b*. Thus, the first issuer database 162*a* may only contain historical transaction data associated with Issuer 1, and the second issuer database 162*b*** may only contain historical transaction data associated with Issuer 2.

To mirror authorization decisions generated by Issuer 1, the first issuer database **162*a* and data associated with the electronic payment transaction associated with Issuer 1 and being processed using the STIP protocol may be input to a first issuer-specific model 164*a* for Issuer 1. The first issuer-specific model 164*a* may be a machine learning model, such as any of the models described herein. Based on the input, the first issuer-specific model 164*a* may generate an authorization decision (without communicating with the system of Issuer 1) and, because the first issuer-specific model 164*a* bases its authorization decision on historical authorization decisions of Issuer 1, the model authorization decision matches (e.g., predicts and/or reproduces) the authorization decision that would have been generated by Issuer 1 had Issuer 1 analyzed the electronic payment transaction. The incorporation of the first issuer-specific model 164*a*, therefore, allows the transaction processing system 110 to generate authorization decisions within the STIP protocol in the manner in which Issuer 1 would have been expected to generate the authorization decision. The authorization decision generated by the first issuer-specific model 164*a* may be communicated to the transaction processing system 110**, which may, in response, continue processing of the electronic payment transaction according to the STIP protocol.

With continued reference to FIG. 12, to mirror authorization decisions generated by Issuer 2, the second issuer database 162*b* and data associated with the electronic payment transaction associated with Issuer 2 and being processed using the STIP protocol may be input to a second issuer-specific model 164*b* for Issuer 2. The second issuer-specific model 164*b* may be a machine learning model, such as any of the types of machine learning models described herein. Based on the input, the second issuer-specific model 164*b* may generate an authorization decision (without communicating with the system of Issuer 2), and because the second issuer-specific model 164*b* bases its authorization decision on historical authorization decisions of Issuer 2, it's authorization decision mirrors the authorization decision that would have been generated by Issuer 2 had Issuer 2 analyzed the electronic payment transaction. The incorporation of the second issuer-specific model 164*b*, therefore, allows the transaction processing system 110 to generate authorization decisions within the STIP protocol in the manner in which Issuer 2 would have been expected to generate the authorization decision. The authorization decision generated by the second issuer-specific model 164*b* may be communicated to the transaction processing system 110, which may, in response, continue processing of the electronic payment transaction according to the STIP protocol.

Additionally or alternatively, the STIP protocol may comprise modeling, with at least one machine learning model, only historical payment transactions of the specific user who initiated the electronic payment transaction so that the authorization decision is customized based on historical transaction behavior of the relevant user. Customizing authorization decisions for a relevant user and based on that user's specific transaction history may generate more accurate authorization decisions for the user, by identifying normal and abnormal behavior of the user. The machine learning model may model historical payment transactions conducted by the user with the specific issuer system involved in the electronic payment transaction (on whose behalf the transaction processing system is acting). The machine learning model may model historical payment transactions conducted by the user across all issuer systems associated with the user.

Figure 13:
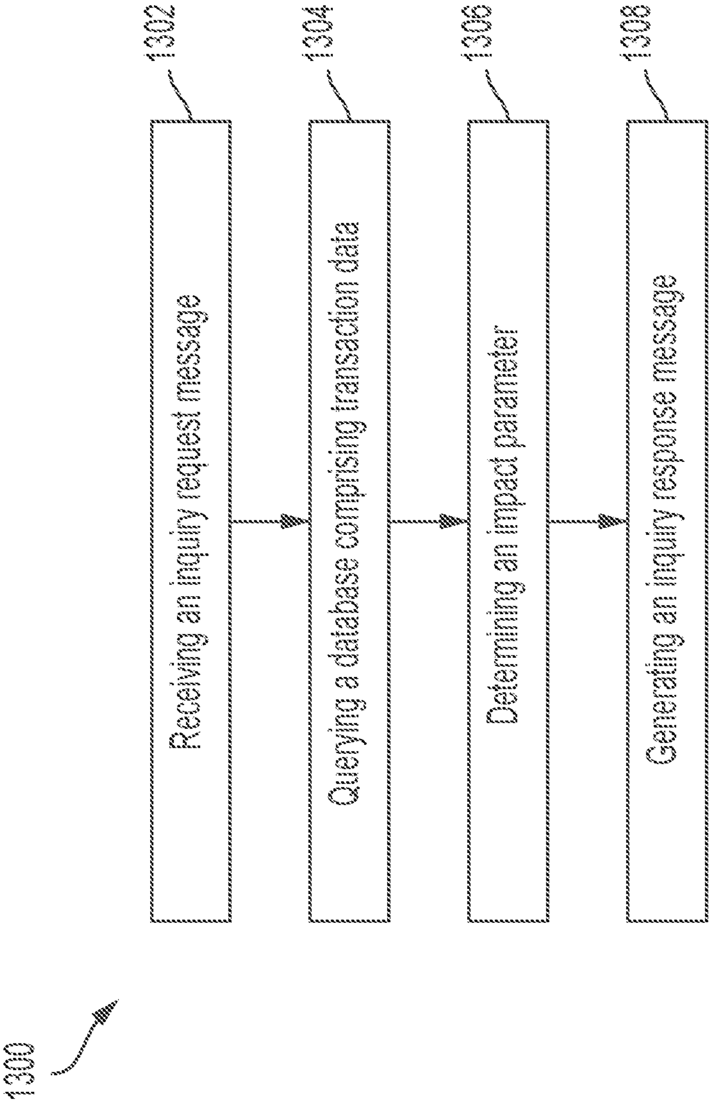
FIG. 13 is a step diagram of a method for interpreting black box models for payment authorization decisions, according to some non-limiting embodiments or aspects.

Referring to FIG. 13, a method 1300 is shown for interpreting black box models for payment authorization decisions, according to some non-limiting embodiments or aspects. The steps shown in FIG. 13 are for example purposes only. It will be appreciated that additional, different, fewer, and/or a different order of steps may be performed in non-limiting embodiments. The method 1300 may include a step 1302 comprising receiving an inquiry request message identifying a first payment transaction having a first plurality of transaction parameters and a first authorization decision.

The method 1300 may include a step 1304 comprising querying a database comprising transaction data associated with a plurality of historical payment transactions to identify a subset of historical payment transactions. The transaction data may include, for each of the plurality of historical payment transactions, a plurality of transaction parameters and an authorization decision. The subset of historical payment transactions may comprise payment transactions having an authorization decision different from the first authorization decision and having a similarity score that satisfies a threshold.

The method 1300 may include a step 1306 comprising determining at least one impact parameter of the first plurality of transaction parameters by comparing the first plurality of transaction parameters with the plurality of transaction parameters associated with the plurality of historical payment transactions in the subset.

The method 1300 may include a step 1308 comprising generating an inquiry response message based on the at least one impact parameter.

In some non-limiting embodiment or aspects, a computer program product for interpreting black box models for payment authorization decisions includes at least one non-transitory computer readable medium including program instructions that, when executed by at least one processor, cause the at least one processor to execute one of the previously-described methods. The at least one processor may include any of the components shown in FIGS. 1-12 (e.g., the user device 102, electronic payment processing network 104, model interpretation network 106, merchant system 108, transaction processing system 110, issuer system 112, black box model 114, MIN processor 116, filters 118, 118*a*, 118*b*, 138, 160, transaction database 120, sample analysis platform 122, second subset database 124, subset database 126, embedding models 134, 142*a*, 142*b*, composite score generator 146, issuer databases 162*a*, 162*b*, issuer-specific models 164*a*, 164*b*, and the like).

Figure 14:
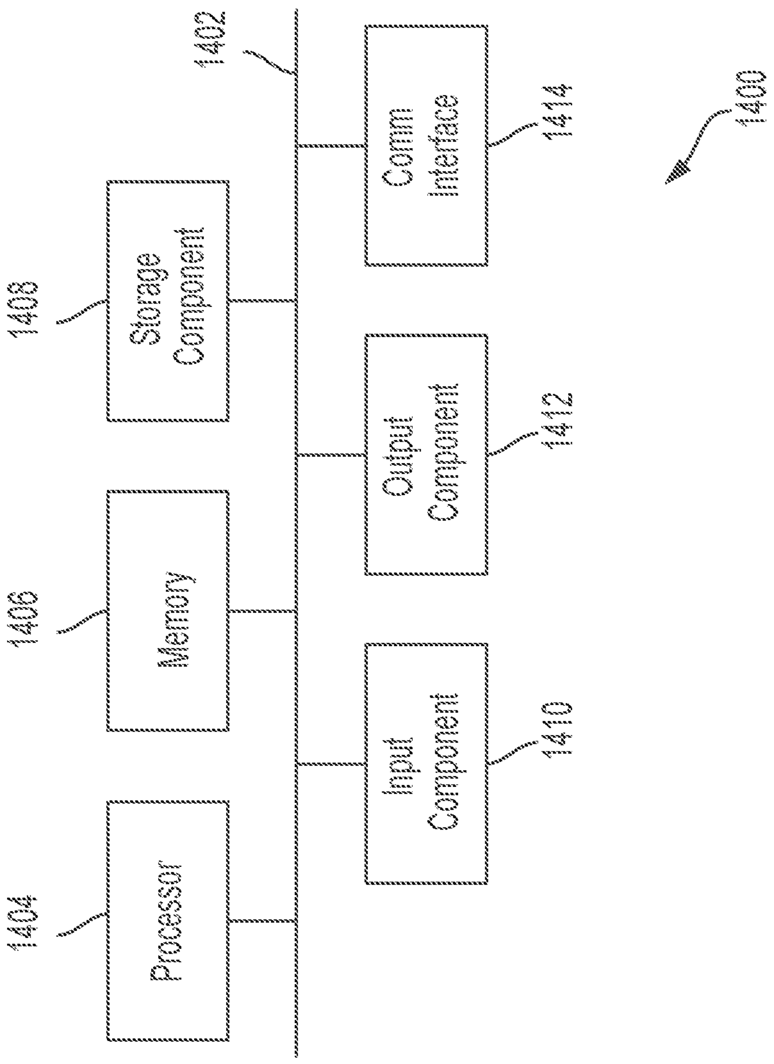
FIG. 14 illustrates example components of a device used in connection with non-limiting embodiments or aspects.

Referring to FIG. 14, shown is a diagram of example components of a device 1400 according to non-limiting embodiments or aspects. Device 1400 may correspond to any of the user device 102, electronic payment processing network 104, model interpretation network 106, merchant system 108, transaction processing system 110, issuer system 112, black box model 114, MIN processor 116, filters 118, 118*a*, 118*b*, 138, 160, transaction database 120, sample analysis platform 122, second subset database 124, subset database 126, embedding models 134, 142*a*, 142*b*, composite score generator 146, issuer databases 162*a*, 162*b*, issuer-specific models 164*a*, 164*b* shown in FIGS. 1-12, as an example. In some non-limiting embodiments or aspects, such systems or devices may include at least one device 1400 and/or at least one component of device 1400. The number and arrangement of components shown are provided as an example. In some non-limiting embodiments or aspects, device 1400 may include additional components, fewer components, different components, or differently arranged components than those shown in FIG. 14. Additionally, or alternatively, a set of components (e.g., one or more components) of device 1400 may perform one or more functions described as being performed by another set of components of device 1400.

As shown in FIG. 14, device 1400 may include a bus 1402, a processor 1404, memory 1406, a storage component 1408, an input component 1410, an output component 1412, and a communication interface 1414. Bus 1402 may include a component that permits communication among the components of device 1400. In some non-limiting embodiments or aspects, processor 1404 may be implemented in hardware, firmware, or a combination of hardware and software. For example, processor 1404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1406 may include random access memory (RAM), read only memory (ROM), and/or another type of dynamic or static storage device (e.g., flash memory, magnetic memory, optical memory, etc.) that stores information and/or instructions for use by processor 1404.

With continued reference to FIG. 14, storage component 1408 may store information and/or software related to the operation and use of device 1400. For example, storage component 1408 may include a hard disk (e.g., a magnetic disk, an optical disk, a magneto-optic disk, a solid state disk, etc.) and/or another type of computer-readable medium. Input component 1410 may include a component that permits device 1400 to receive information, such as via user input (e.g., a touch screen display, a keyboard, a keypad, a mouse, a button, a switch, a microphone, etc.). Additionally, or alternatively, input component 1410 may include a sensor for sensing information (e.g., a global positioning system (GPS) component, an accelerometer, a gyroscope, an actuator, etc.). Output component 1412 may include a component that provides output information from device 1400 (e.g., a display, a speaker, one or more light-emitting diodes (LEDs), etc.). Communication interface 1414 may include a transceiver-like component (e.g., a transceiver, a separate receiver and transmitter, etc.) that enables device 1400 to communicate with other devices, such as via a wired connection, a wireless connection, or a combination of wired and wireless connections. Communication interface 1414 may permit device 1400 to receive information from another device and/or provide information to another device. For example, communication interface 1414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 1400 may perform one or more processes described herein. Device 1400 may perform these processes based on processor 1404 executing software instructions stored by a computer-readable medium, such as memory 1406 and/or storage component 1408. A computer-readable medium may include any non-transitory memory device. A memory device includes memory space located inside of a single physical storage device or memory space spread across multiple physical storage devices. Software instructions may be read into memory 1406 and/or storage component 1408 from another computer-readable medium or from another device via communication interface 1414. When executed, software instructions stored in memory 1406 and/or storage component 1408 may cause processor 1404 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The terms "programmed to" and/or "configured to," as used herein, may refer to an arrangement of software, device(s), and/or hardware for performing and/or enabling one or more functions (e.g., actions, processes, steps of a process, and/or the like). For example, "a processor programmed or configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:

receiving, with at least one processor, an inquiry request message identifying a first payment transaction having a first plurality of transaction parameters and a first authorization decision;

filtering, with at least one processor, a plurality of historical payment transactions stored in a database comprising transaction data to identify a first subset of historical payment transactions from the plurality of historical payment transactions, the transaction data comprising, for each of the plurality of historical payment transactions, a plurality of transaction parameters and an authorization decision, wherein the first subset comprises payment transactions having an authorization decision different from the first authorization decision;

for each of the historical payment transactions in the first subset, generating, with an embedding model, an embedding representing the historical payment transaction based on the transaction parameters for the historical payment transaction;

generating, with the embedding model, an embedding representing the first payment transaction based on the first plurality of transaction parameters;

for each of the historical payment transactions in the first subset, generating, with at least one processor, a similarity score relative to the first payment transaction based on comparing the first plurality of transaction parameters to the plurality of transaction parameters associated with each of the historical payment transactions in the first subset, wherein generating the similarity score relative to the first payment transaction comprises comparing the embedding representing the historical payment transaction with the embedding representing the first payment transaction, the similarity score generated only for historical payment transactions in the first subset;

filtering, with at least one processor, the first subset to identify a second subset of historical payment transactions from the first subset based on the similarity score for each payment transaction in the second subset of historical payment transactions satisfying a threshold;

inputting, with at least one processor, only the second subset of historical payment transactions to a machine-learning model;

determining, with the machine-learning model, at least one impact parameter of the first plurality of transaction parameters by comparing the first plurality of transaction parameters with the plurality of transaction parameters associated with the plurality of historical payment transactions in the second subset;

determining that the at least one impact parameter corresponds to an incorrect reason for the first authorization decision; and retraining, with at least one processor, the machine-learning model based on determining that the at least one impact parameter corresponds to an incorrect reason for the first authorization decision.

2. The method of claim 1, wherein generating the similarity score comprises:

generating a first score based on comparing categorical transaction parameters of the first plurality of transaction parameters to categorical transaction parameters of the plurality of transaction parameters associated with each of the historical payment transactions in the first subset;

generating a second score based on comparing numerical transaction parameters of the first plurality of transaction parameters to numerical transaction parameters of the plurality of transaction parameters associated with each of the historical payment transactions in the first subset; and generating the similarity score as a composite of the first score and the second score.

3. The method of claim 1, wherein the first subset does not include all of the historical payment transactions in the plurality of historical payment transactions, and the second subset does not include all of the historical payment transactions in the first subset.

4. The method of claim 1, wherein the first authorization decision was generated by a transaction processing system of a transaction service provider acting on behalf of an issuer system of an issuer.

5. The method of claim 4, wherein the first authorization decision was generated by the transaction processing system while the issuer system failed to communicate with an electronic payment processing network.

6. The method of claim 4, wherein the first authorization decision was generated by the transaction processing system by applying the first plurality of transaction parameters to a black box machine-learning model, wherein the black box machine-learning model is generated based on modeling historical authorization decisions of the issuer system.

7. The method of claim 4, wherein the first authorization decision was generated by the transaction processing system based on historical transaction data associated with a user initiating the first payment transaction.

8. The method of claim 1, wherein the first authorization decision comprises an authorization decline, and the authorization decision for each historical payment transaction in the first subset comprises an authorization approval.

9. The method of claim 1, wherein the impact parameter at least partially caused generation of the first authorization decision different from the authorization decisions of the plurality of historical payment transactions in the first subset.

10. The method of claim 1, comprising:

displaying, on a user device, data associated with the first payment transaction and a selectable element associated with the data associated with the first payment transaction;

receiving, by the user device, user input indicating selection of the selectable element; and in response to selection of the selectable element, generating and transmitting, by the user device, the inquiry request message.

11. A system comprising at least one processor programmed or configured to:

receive an inquiry request message identifying a first payment transaction having a first plurality of transaction parameters and a first authorization decision;

filter a plurality of historical payment transactions stored in a database comprising transaction data to identify a first subset of historical payment transactions from the plurality of historical payment transactions, the transaction data comprising, for each of the plurality of historical payment transactions, a plurality of transaction parameters and an authorization decision, wherein the first subset comprises payment transactions having an authorization decision different from the first authorization decision;

for each of the historical payment transactions in the first subset, generate, with an embedding model, an embedding representing the historical payment transaction based on the transaction parameters for the historical payment transaction;

generate, with the embedding model, an embedding representing the first payment transaction based on the first plurality of transaction parameters;

for each of the historical payment transactions in the first subset, generate a similarity score relative to the first payment transaction based on comparing the first plurality of transaction parameters to the plurality of transaction parameters associated with each of the historical payment transactions in the first subset, wherein generating the similarity score relative to the first payment transaction comprises comparing the embedding representing the historical payment transaction with the embedding representing the first payment transaction, the similarity score generated only for historical payment transactions in the first subset;

filter the first subset to identify a second subset of historical payment transactions from the first subset based on the similarity score for each payment transaction in the second subset of historical payment transactions satisfying a threshold;

input only the second subset of historical payment transactions to a machine-learning model;

determine, with the machine-learning model, at least one impact parameter of the first plurality of transaction parameters by comparing the first plurality of transaction parameters with the plurality of transaction parameters associated with the plurality of historical payment transactions in the second subset;

determine that the at least one impact parameter corresponds to an incorrect reason for the first authorization decision; and retrain the machine-learning model based on determining that the at least one impact parameter corresponds to an incorrect reason for the first authorization decision.

12. The system of claim 11, wherein generating the similarity score comprises the at least one processor being programmed or configured to:

generate a first score based on comparing categorical transaction parameters of the first plurality of transaction parameters to categorical transaction parameters of the plurality of transaction parameters associated with each of the historical payment transactions in the first subset;

generate a second score based on comparing numerical transaction parameters of the first plurality of transaction parameters to numerical transaction parameters of the plurality of transaction parameters associated with each of the historical payment transactions in the first subset; and generate the similarity score as a composite of the first score and the second score.

13. The system of claim 11, wherein the first subset does not include all of the historical payment transactions in the plurality of historical payment transactions, and the second subset does not include all of the historical payment transactions in the first subset.

14. The system of claim 11, wherein the first authorization decision was generated by a transaction processing system of a transaction service provider acting on behalf of an issuer system of an issuer.

15. The system of claim 14, wherein the first authorization decision was generated by the transaction processing system while the issuer system failed to communicate with an electronic payment processing network.

16. The system of claim 14, wherein the first authorization decision was generated by the transaction processing system by applying the first plurality of transaction parameters to a black box machine-learning model, wherein the black box machine-learning model is generated based on modeling historical authorization decisions of the issuer system.

17. The system of claim 14, wherein the first authorization decision was generated by the transaction processing system based on historical transaction data associated with a user initiating the first payment transaction.

18. A computer program product comprising at least one non-transitory computer-readable medium including program instructions that, when executed by at least one processor, cause the at least one processor to:

receive an inquiry request message identifying a first payment transaction having a first plurality of transaction parameters and a first authorization decision;

filter a plurality of historical payment transactions stored in a database comprising transaction data to identify a first subset of historical payment transactions from the plurality of historical payment transactions, the transaction data comprising, for each of the plurality of historical payment transactions, a plurality of transaction parameters and an authorization decision, wherein the first subset comprises payment transactions having an authorization decision different from the first authorization decision;

for each of the historical payment transactions in the first subset, generate, with an embedding model, an embedding representing the historical payment transaction based on the transaction parameters for the historical payment transaction;

generate, with the embedding model, an embedding representing the first payment transaction based on the first plurality of transaction parameters;

for each of the historical payment transactions in the first subset, generate a similarity score relative to the first payment transaction based on comparing the first plurality of transaction parameters to the plurality of transaction parameters associated with each of the historical payment transactions in the first subset, wherein generating the similarity score relative to the first payment transaction comprises comparing the embedding representing the historical payment transaction with the embedding representing the first payment transaction, the similarity score generated only for historical payment transactions in the first subset;

filter the first subset to identify a second subset of historical payment transactions from the first subset based on the similarity score for each payment transaction in the second subset of historical payment transactions satisfying a threshold;

input only the second subset of historical payment transactions to a machine-learning model;

determine, with the machine-learning model, at least one impact parameter of the first plurality of transaction parameters by comparing the first plurality of transaction parameters with the plurality of transaction parameters associated with the plurality of historical payment transactions in the second subset;

determine that the at least one impact parameter corresponds to an incorrect reason for the first authorization decision; and retrain the machine-learning model based on determining that the at least one impact parameter corresponds to an incorrect reason for the first authorization decision.

* * * * *